(12) United States Patent
Kim et al.

(10) Patent No.: US 11,151,357 B2
(45) Date of Patent: Oct. 19, 2021

(54) ELECTRONIC APPARATUS FOR OBJECT RECOGNITION AND CONTROL METHOD THEREOF

(71) Applicant: SAMSUNG ELECTRONICS CO., LTD., Suwon-si (KR)

(72) Inventors: Eunseo Kim, Suwon-si (KR); Yehoon Kim, Suwon-si (KR); Chanwon Seo, Suwon-si (KR); Inhak Na, Suwon-si (KR); Myungjin Eom, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/890,337

(22) Filed: Jun. 2, 2020

(65) Prior Publication Data
US 2020/0380242 A1  Dec. 3, 2020

(30) Foreign Application Priority Data

Jun. 3, 2019 (KR) .......... 10-2019-0065519
Aug. 14, 2019 (KR) .......... 10-2019-0099904
Oct. 2, 2019 (KR) .......... 10-2019-0122580

(51) Int. Cl.
*G06K 9/00* (2006.01)
(52) U.S. Cl.
CPC ..... *G06K 9/00201* (2013.01); *G06K 9/00664* (2013.01)
(58) Field of Classification Search
CPC .......... G06K 9/00201; G06K 9/00664; G06K 9/6271
See application file for complete search history.

(56) References Cited

U.S. PATENT DOCUMENTS 9,788,168 B2* 10/2017 Arastafar .............. H04W 4/029
9,798,957 B2  10/2017 Noh et al.
(Continued)

FOREIGN PATENT DOCUMENTS

JP        2016-192096 A    11/2016
KR   10-2016-0038437 A     4/2016
(Continued)

OTHER PUBLICATIONS

Automatic Object Tracking, Sep. 7, 2018, An IP.com Prior Art Database Technical Disclosure, 23 pages (Year: 2018).*
(Continued)

*Primary Examiner* — Lewis G West
(74) *Attorney, Agent, or Firm* — Sughrue Mion, PLLC

(57) ABSTRACT

An electronic apparatus is disclosed. The electronic apparatus includes a sensor, a camera, a memory, a camera and a processor. The memory stores a plurality of artificial intelligence models trained to identify objects and stores information on a map. The first processor provides, to the second processor, area information on an area in which the electronic apparatus is determined, based on sensing data obtained from the sensor, to be located, from among a plurality of areas included in the map. The second processor loads at least one artificial intelligence model of the plurality of artificial intelligence models to the volatile memory based on the area information and identifies an object by inputting the image obtained through the camera to the loaded artificial intelligence model.

21 Claims, 26 Drawing Sheets

(56) References Cited

U.S. PATENT DOCUMENTS

| | | | |
|---|---|---|---|
| 9,824,578 | B2 | 11/2017 | Burton et al. |
| 10,175,688 | B2 | 1/2019 | Shin et al. |
| 10,229,317 | B2 | 3/2019 | Rajkumar et al. |
| 10,335,949 | B2 | 7/2019 | Shin et al. |
| 10,528,799 | B2 | 1/2020 | Han et al. |
| 10,735,212 | B1* | 8/2020 | Zarakas ............... G06N 3/0454 |
| 10,970,900 | B2* | 4/2021 | Kim ..................... G06N 3/0472 |
| 2016/0089783 | A1 | 3/2016 | Noh et al. |
| 2017/0203439 | A1 | 7/2017 | Shin et al. |
| 2017/0205822 | A1 | 7/2017 | Shin et al. |
| 2017/0344850 | A1 | 11/2017 | Kobori et al. |
| 2018/0027988 | A1* | 2/2018 | Poodeh ................. A47C 21/048 |
| 2018/0033148 | A1* | 2/2018 | Zheng ..................... B60R 1/00 |
| 2018/0074508 | A1 | 3/2018 | Kleiner et al. |
| 2018/0181797 | A1 | 6/2018 | Han et al. |
| 2019/0021568 | A1 | 1/2019 | Kim |
| 2019/0072977 | A1 | 3/2019 | Jeon |
| 2019/0285748 | A1* | 9/2019 | DeVries ................ H04W 4/029 |
| 2020/0143149 | A1 | 5/2020 | Han et al. |
| 2020/0186227 | A1* | 6/2020 | Reider ................. H04B 7/0626 |
| 2020/0249047 | A1* | 8/2020 | Balva ................. G01C 21/3492 |
| 2020/0256856 | A1* | 8/2020 | Chou ................. G06K 9/00134 |
| 2020/0350063 | A1* | 11/2020 | Thornton ........... G06K 9/00691 |
| 2021/0011477 | A1* | 1/2021 | Byun ................... G05D 1/0238 |
| 2021/0056753 | A1* | 2/2021 | Yasar ................. G06K 9/00201 |
| 2021/0142061 | A1* | 5/2021 | Shin ...................... A47L 9/2826 |
| 2021/0172758 | A1* | 6/2021 | John ................. G01C 21/3667 |

FOREIGN PATENT DOCUMENTS

| | | |
|---|---|---|
| KR | 10-2018-0074565 A | 7/2018 |
| KR | 10-1901599 B1 | 9/2018 |
| KR | 1020190010303 A | 1/2019 |
| KR | 10-2019-0026116 A | 3/2019 |

OTHER PUBLICATIONS

International Search Report (PCT/ISA/210) dated Sep. 11, 2020 issued by the International Searching Authority in International Application No. PCT/KR2020/006968.

Written Opinion (PCT/ISA/237) dated Sep. 11, 2020 issued by the International Searching Authority in International Application No. PCT/KR2020/006968.

Communication dated Apr. 15, 2021 issued by the Korean Intellectual Property Office in application No. English 10-2019-0122580.

* cited by examiner

FIG. 4

| OBJECT | AIR CONDITIONER MODEL (401) | REFRIGERATOR MODEL (402) | ... | BEDROOM MODEL (410) | LIVING ROOM MODEL (420) | KITCHEN MODEL (430) | KID ROOM MODEL (440) | ... |
|---|---|---|---|---|---|---|---|---|
| AIR CONDITIONER | O | X | ... | O | O | O | O | ... |
| REFRIGERATOR | X | O | ... | X | X | O | X | ... |
| TV | X | X | ... | O | O | X | X | ... |
| ... | ... | ... | ... | ... | ... | ... | ... | ... |
| BED | X | X | ... | O | X | X | O | ... |
| SOFA | X | X | ... | X | O | X | X | ... |
| CHAIR | X | X | ... | O | X | O | O | ... |
| ... | ... | ... | ... | ... | ... | ... | ... | ... |
| CUP | X | X | ... | O | O | O | O | ... |
| GLASS BOTTLE | X | X | ... | O | O | O | O | ... |
| PLATE | X | X | ... | O | O | X | X | ... |
| ... | ... | ... | ... | ... | ... | ... | ... | ... |
| LIQUID | X | X | ... | O | O | O | O | ... |
| DOG FECES | X | X | ... | O | O | O | O | ... |
| POO PAD | X | X | ... | X | O | X | X | ... |
| ... | ... | ... | ... | ... | ... | ... | ... | ... |
| CARPET | X | X | ... | X | O | X | X | ... |
| PLASTIC BAG | X | X | ... | X | O | O | O | ... |
| CABLE | X | X | ... | O | O | O | O | ... |
| SOCK | X | X | ... | O | O | O | O | ... |
| ... | ... | ... | ... | ... | ... | ... | ... | ... |

FIG. 7A

| OBJECT | BEDROOM (51) | LIVING ROOM (52) | ... |
|---|---|---|---|
| AIR CONDITIONER (11) | ○ | ○ | ... |
| REFRIGERATOR (12) | × | × | ... |
| TV(13) | ○ | ○ | ... |
| ⋮ | ⋮ | ⋮ | ... |
| BED (21) | ○ | × | ... |
| SOFA (22) | × | ○ | ... |
| CHAIR (23) | ○ | × | ... |
| ⋮ | ⋮ | ⋮ | ... |

| OBJECT | LIVING ROOM (52) |
|---|---|
| AIR CONDITIONER (11) | ○ |
| REFRIGERATOR (12) | × |
| TV(13) | ○ |
| ⋮ | ⋮ |
| BED (21) | × |
| SOFA (22) | ○ |
| CHAIR (23) | × |
| ⋮ | ⋮ |

| OBJECT | LIVING ROOM (52) |
|---|---|
| AIR CONDITIONER (11) | ○ |
| REFRIGERATOR (12) | × |
| TV(13) | ○ |
| ⋮ | ⋮ |
| BED (21) | × |
| SOFA (22) | [×] |
| CHAIR (23) | × |
| ⋮ | ⋮ |

| OBJECT | LIVING ROOM (52) |
|---|---|
| AIR CONDITIONER (11) | ○ |
| REFRIGERATOR (12) | × |
| TV(13) | ○ |
| ⋮ | ⋮ |
| BED (21) | × |
| SOFA (22) | × |
| CHAIR (23) | × |
| ⋮ | ⋮ |

| OBJECT | LIVING ROOM (52) |
|---|---|
| AIR CONDITIONER (11) | ○ |
| REFRIGERATOR (12) | × |
| TV(13) | ○ |
| ⋮ | ⋮ |
| BED (21) | × |
| SOFA (22) | × |
| CHAIR (23) | [○] |
| ⋮ | ⋮ |

# ELECTRONIC APPARATUS FOR OBJECT RECOGNITION AND CONTROL METHOD THEREOF

CROSS-REFERENCE TO RELATED APPLICATION(S)

This application is based on and claims priority under 35 U.S.C. § 119 to Korean patent application number 10-2019-0065519, filed on Jun. 3, 2019, Korean patent application number 10-2019-0099904, filed on Aug. 14, 2019, and Korean patent application number 10-2019-0122580, filed on Oct. 2, 2019, in the Korean Intellectual Property Office, the disclosure of which is incorporated by reference herein in its entirety.

BACKGROUND

1. Field

The disclosure relates to an electronic apparatus for object recognition. More specifically, the disclosure relates an electronic apparatus configured to perform object recognition using an artificial intelligence model corresponding to a location of the electronic apparatus.

2. Description of Related Art

Recently, with artificial intelligence models being used in object recognition technology, object recognition capability of electronic apparatuses has greatly improved.

However, as more developed forms of artificial intelligence models are used to more accurately recognize far more objects, the amount of processing performed has proportionately increased and electronic apparatuses require a very large memory capacity or memory speed.

Accordingly, there have been limitations in overcoming the object recognition capability of user devices, specifically with respect to memory, processing capability and communication capability, by simply improving only the functions of the artificial intelligence model itself.

SUMMARY

The disclosure provides an electronic apparatus configured to perform object recognition using an artificial intelligence model corresponding to a location of the electronic apparatus, and a method of operating the same.

Additional aspects will be set forth in part in the description which follows and, in part, will be apparent from the description or may be learned by practice of the presented embodiments.

In accordance with an aspect of the disclosure, an electronic apparatus includes: a sensor; a camera; a storage for storing a plurality of artificial intelligence models trained to identify objects and for storing information on a map; a first processor configured to control the electronic apparatus; and a second processor configured to recognize an object, wherein the first processor is configured to determine, based on sensing data obtained from the sensor, an area in which the electronic apparatus is located from among a plurality of areas included in the map, and provide area information on the determined area to the second processor, and wherein the second processor includes a volatile memory and is configured to: load an artificial intelligence model, from among the plurality of artificial intelligence models stored in the storage, to the volatile memory based on the area information provided by the first processor, and input an image obtained through the camera to the loaded artificial intelligence model to identify an object.

In accordance with another aspect of the disclosure, an electronic apparatus includes: a camera; a sensor; a storage for storing a plurality of artificial intelligence models trained to identify objects and for storing information on a map; and a processor configured to control the electronic apparatus, wherein the processor includes a volatile memory, and wherein the processor is configured to: determine, based on sensing data obtained from the sensor, an area in which the electronic apparatus is located from among a plurality of areas included in the map, based on the determined area, load an artificial intelligence model from among the plurality of artificial intelligence models stored in the storage, and input an image obtained through the camera to the loaded artificial intelligence model to identify an object.

In accordance with another aspect of the disclosure, a control method of an electronic apparatus using an object recognition model includes: identifying a plurality of areas included in a map based on information on the map stored in a storage of the electronic apparatus; determining an area in which the electronic apparatus is located from among the plurality of areas based on sensing data obtained from a sensor; loading, to a volatile memory, an artificial intelligence model, from among a plurality of artificial intelligence models stored in the storage, based on the determined area; and identifying an object by inputting an image obtained through a camera to the loaded artificial intelligence model.

In accordance with another aspect of the disclosure, an electronic apparatus includes: a storage; and at least one processor including a volatile memory and configured to: determine an area in which the electronic apparatus is located from among a plurality of areas included in a map, based on the determined area, load an artificial intelligence model, from among the plurality of artificial intelligence models stored in the storage, corresponding to the determined area, and input an image obtained through the camera to the loaded artificial intelligence model to identify an object.

BRIEF DESCRIPTION OF THE DRAWINGS

The above and other aspects, features and advantages of certain embodiments of the present disclosure will be more apparent from the following description, taken in conjunction with the accompanying drawings, in which:

FIG. 4 is a diagram of a table illustrating an example of a plurality of artificial intelligence models stored in a storage of an electronic apparatus;

FIG. 6B is a diagram illustrating an example of an electronic apparatus dividing a first dimensional map to a plurality of areas using results identifying a wall, a door, or the like;

FIG. 7A is diagram illustrating an example of an electronic apparatus obtaining an artificial intelligence model corresponding to each of a plurality of areas using an object located in each of a plurality of areas;

DETAILED DESCRIPTION

Figure 1:
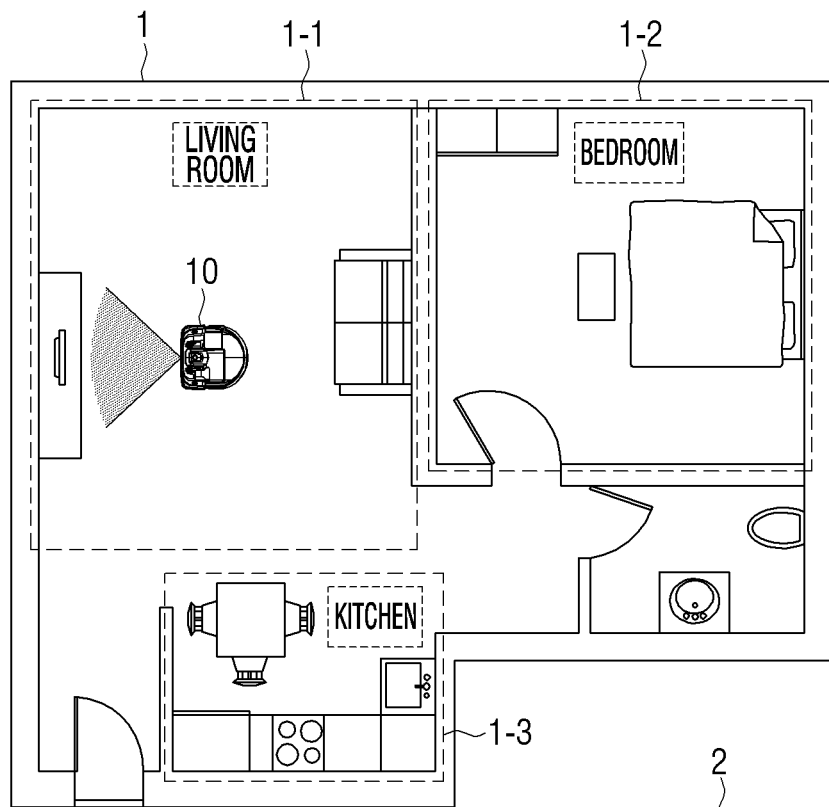
FIG. 1 is a diagram illustrating an example of an electronic apparatus identifying an object using different artificial intelligence models for each area (e.g., living room and kitchen) according to an embodiment.

The disclosure relates to an electronic apparatus performing highly efficient object recognition by selectively using only circumstance-appropriate artificial intelligence models.

More specifically, the disclosure provides an electronic apparatus capable of recognizing objects of various types, while being able to recognize objects relatively quickly compared to its limited processing capabilities.

Before describing embodiments below, the description method of the disclosure and drawings are described.

First, the terms used in the disclosure are general terms identified in consideration of the functions of the various embodiments of the disclosure. However, these terms may vary depending on intention, legal or technical interpretation, emergence of new technologies, and the like of those skilled in the related art. In addition, there may be some arbitrary terms selected by an applicant. The terms may be interpreted based on the meanings as defined herein, and may be construed based on the overall content of the disclosure and the technological common sense of those skilled in the related art in case no specific definition of the term is described.

In addition, like reference numerals or characters disclosed in each of the drawings attached herein indicate a component or element performing substantially the same functions. For convenience of descriptions and understandings, like reference numerals or characters may be used to describe different embodiments. That is, even if an element with a like reference numeral is illustrated in all of a plurality of drawings, the plurality of drawings may not necessarily refer to only one embodiment.

In addition, the terms including ordinal numbers such as "first" and "second" may be used to differentiate between elements in the disclosure. These ordinal numbers are used merely to distinguish same or similar elements from one another, and should not be understood as limiting the meaning of the terms as a result of using these ordinal numbers. For example, the elements associated with the ordinal numbers should not be limited in order or order of use by the numbers. If necessary, each ordinal number may be used interchangeably.

A singular expression in the disclosure includes a plural expression, unless otherwise specified clearly in context. It is to be understood that the terms such as "comprise" or "consist of" are used herein to designate a presence of a characteristic, a number, a step, an operation, an element, a component, or a combination thereof, and not to preclude a presence or a possibility of adding one or more of other characteristics, numbers, steps, operations, elements, components or a combination thereof.

In the description, terms such as "module," "unit," and "part" may be used to refer to an element performing at least one function or operation, and these elements may be implemented as hardware or software, or a combination of hardware and software. Further, except for when each of a plurality of "modules," "units," "parts," and the like needs to be implemented in an individual hardware, the components may be integrated in at least one module or chip and be implemented in at least one processor In addition, in an embodiment, when any part is indicated as connected to another part, this includes not only a direct connection, but also an indirect connection through another medium. Further, when a particular part includes a particular element, an another element may be further included rather than precluding the other element, unless otherwise specified.

FIG. 1 is a diagram illustrating an example of an electronic apparatus identifying an object using different artificial intelligence models for each area (e.g., living room and kitchen) according to an embodiment.

FIG. 1 illustrates an object recognition process of an electronic apparatus 10 implemented as a robot cleaner according to an embodiment. FIG. 1 illustrates a situation where a plurality of artificial intelligence models for recognizing various objects such as a television (TV), a sofa, a bed, a closet, clothes, foreign substance, a chair, a sink, and an air conditioner is stored in a non-volatile memory or a storage of an electronic apparatus 10.

Referring to FIG. 1, the electronic apparatus 10, which is a robot cleaner, may move around areas 1-1, 1-2, and 1-3 on a map 1 photographing images of various objects, and may input the photographed images to a plurality of artificial intelligence models to recognize objects within an image.

In this case, a capacity or processing rate of a volatile memory of the electronic apparatus 10 may be insufficient for the electronic apparatus 10 to load the plurality of artificial intelligence models stored in the non-volatile memory such as a storage and to perform object recognition.

Accordingly, the electronic device 10 may determine an area in which the electronic apparatus 10 is located from the areas on the map 1, and load, to a volatile memory, only the artificial intelligence model corresponding to the area in which the electronic apparatus 10 is located from among the stored plurality of artificial intelligence models to recognize the object in the image of the photographed object.

To this end, each of the plurality of artificial intelligence models stored for different areas may be pre-stored in the electronic apparatus 10.

For example, referring to table (2) in FIG. 1, a living room model 2-1 may recognize an air conditioner, a TV, and the like, which are normally located in the living room. On the other hand, the living room model 2-1 may not recognize a refrigerator, a bed, and the like not normally located in the living room.

In addition, referring to table (2), a bedroom model 2-2 may not recognize a refrigerator while recognizing an air conditioner, a TV, a bed, and the like.

Accordingly, if the electronic apparatus 10 is located in the living room 1-1, the electronic apparatus 10 may selectively load, to the volatile memory of a processor, only the living room model 2-1, from among the stored plurality of artificial intelligence models, to recognize the air conditioner, the TV, and the like, and use the loaded living room model 2-1 to perform recognition on the object in the image photographed from the living room 1-1.

On the other hand, if the electronic apparatus 10 is located in a bed room 1-2, the electronic apparatus 10 may selectively load, to the volatile memory of a processor, only the bed room model 2-2, from among the stored plurality of artificial intelligence models, to recognize the air conditioner, the TV, the bed, and the like, and use the loaded bed room model 2-2 to perform recognition on the object in the image photographed from the bed room 1-2.

Configurations and operations of an electronic apparatus 10, 100 according to various embodiments are described in greater detail below.

Figure 2:
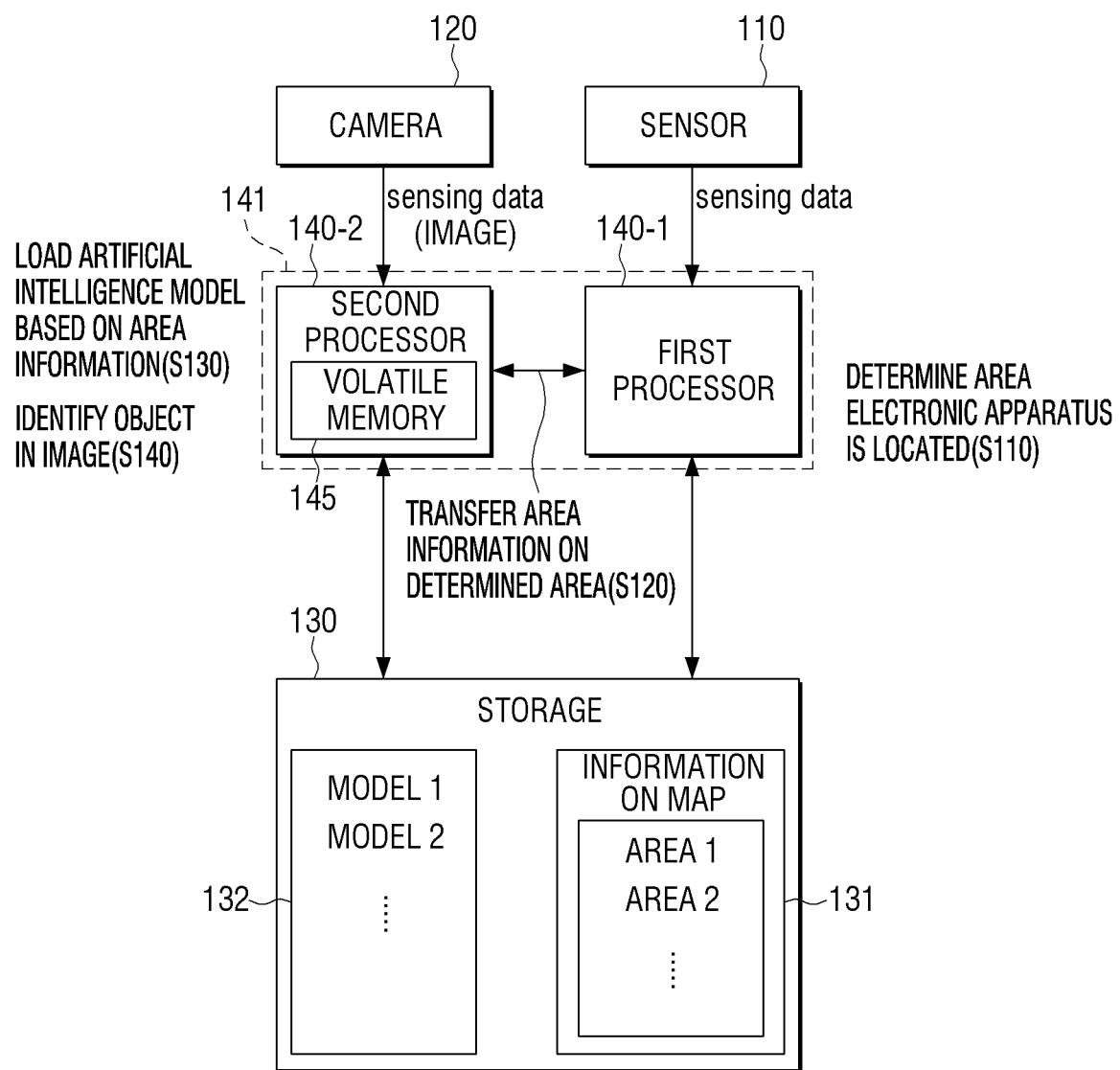
FIG. 2 is a block diagram illustrating a configuration of an electronic apparatus according to an embodiment.

FIG. 2 is a block diagram illustrating a configuration of an electronic apparatus 100 according to an embodiment.

Referring to FIG. 2, the electronic apparatus 100 may include a sensor 110, a camera 120, a storage 130, a first processor 140-1, and a second processor 140-2. The electronic apparatus 100 may be a moving robot provided with moving mechanisms or means or an auxiliary device capable of connecting and detaching to a moving device. The electronic apparatus 100 may be implemented as a wearable device of various types. In addition, the electronic apparatus 100 may be implemented as various terminal apparatuses such as a smartphone, a tablet personal computer (PC), a notebook PC, etc.

The sensor 110, as a configuration for determining the location of the electronic apparatus 100, may be implemented as a light detection and ranging (LiDAR) sensor, an ultrasonic sensor and the like, but is not limited thereto.

The camera 120 is a configuration for obtaining or capturing one or more images on the surroundings of the electronic apparatus 100. The camera 120 may be implemented as a red/green/blue (RGB) camera, a three dimensional (3D) camera, and the like.

The storage 130 is a configuration for variably storing various information related to the functions of the electronic apparatus 100. The storage 130 may be implemented as a non-volatile memory such as a hard disk, a solid state drive (SSD), and a flash memory (e.g., NOR-type flash memory or NAND-type flash memory).

The storage 130 may be stored with information 131 on the map. The map may refer to data indicating a physical terrain of a place in which the electronic apparatus 100 is operated. While the map may be stored in image form on the storage 130, it is understood that one or more other embodiments are not limited thereto.

The information on the map, or the map itself, may include terrain information of the place the electronic apparatus 100 is operated. Area information of each of the plurality of areas included in the map, additional information related to the map, and the like may also be included.

The terrain information may include information on a structure (e.g., shape and/or size) of the place, information of the structure (e.g., shape and/or size) of each of the plurality of areas included in the space, information on a location within the place of each of the plurality of areas, and the like.

The area information may refer to information for identifying each of the plurality of areas. The area information may consist of or include identification names indicating each of the plurality of areas, identification numbers, and the like. In addition, the area information may include information on use of each of the plurality of areas, and each of the plurality of areas according to area information may be defined as, for example, living room, bath room, bedroom, and the like.

The additional information may include information on use of place (e.g., home, work, gym, etc.), location, name, user, and the like, and data on images obtained through the camera 120 at each of the plurality of areas.

The storage 130 may store one or more artificial intelligence models 132. Specifically, a plurality of artificial intelligence models 132 trained to identify objects may be stored in the storage 130 according to an embodiment. For example, artificial intelligence models trained to identify objects included in the input image may be stored in plural.

The identifying an object may be understood as obtaining information on an object, such as name and type of the object. In this case, information on the objects may be information on the identified object output by the plurality of artificial intelligence models that identified the related object.

The first processor 140-1 may be connected with the sensor 110 and the storage 130 to control the electronic apparatus 100. Further, the first processor 140-1 may be connected to the second processor 140-2 as a main processor to control the second processor 140-2.

The second processor 140-2 may be connected to the camera 120, the storage 130, and the first processor 140-1 to perform a function for object recognition.

Referring to FIG. 2, the first processor 140-1 may determine an area in which the electronic apparatus 100 is located from among the plurality of areas included in the map (operation S110). Specifically, the first processor 140-1 may use information on the map divided by the plurality of areas to identify the plurality of areas included in the map, and use sensing data obtained through the sensor 110 to determine the area in which the electronic apparatus 100 is located from among the plurality of areas on the map.

The first processor 140-1 may transfer area information on the determined area to the second processor 140-2 connected to the first processor 140-1 (operation S120). The first processor 140-1 may transfer the area information to the second processor 140-2 in the form of an electrical signal or data.

The second processor 140-2 may, based on area information transferred from the first processor 140-1, load at least one artificial intelligence model of the plurality of artificial intelligence models 132 (i.e., model 1, model 2 . . . ) stored in the storage 130 to the volatile memory 145. Specifically, the second processor 140-2 may load the artificial intelligence model corresponding to the determined area from among the plurality of artificial intelligence models 132.

In this case, the second processor 140-2 may use the plurality of artificial intelligence models 132 stored in the storage 130 and a logical mapping information between the plurality of areas to identify and load the artificial intelligence model mapped to the determined area.

The logical mapping information may be information for mapping one or more artificial intelligence models in or to each of the plurality of areas. The logical mapping information may include information on a parameter for outputting information indicating at least one of the plurality of artificial intelligence models 132 from information indicating each of the plurality of areas. The logical mapping information may include information on addresses of artificial intelligence models corresponding to each area stored in the storage 130.

The logical mapping information may be pre-set by the user, and/or may be generated and stored by the first processor 140-1 that obtained the artificial intelligence model corresponding to (mapping) each of the plurality of areas according to, for example, the embodiments of FIGS. 7A to 7C, which are described below. In addition, based on the updated results of the artificial intelligence model corresponding to each of the plurality of areas according to, for example, the embodiments of FIGS. 8A to 8C and FIGS. 9A to 9C described below, the logical mapping information may also be updated.

The first processor 140-1 may use the logical mapping information on the determined area to identify the artificial intelligence model corresponding to the determined area. The second processor 140-2 may load the corresponding artificial intelligence model when (or based on) information on the identified artificial intelligence model is transferred to the second processor 140-2.

The second processor 140-2 may input the image obtained through the camera 120 to the loaded artificial intelligence model to identify the object (operation S140). In this case, the second processor 140-2 may use the output of the loaded model to identify the object included in the image obtained through the camera 120.

Accordingly, because the second processor 140-2 may load only the artificial intelligence model corresponding to the determined area from among the plurality of artificial intelligence models 132 stored in the storage 130 for use in object recognition, a relatively accurate and fast object recognition may be performed within the processing capabilities of the second processor 140-2.

In this regard, if the area in which the electronic apparatus 100 is located is changed, the second processor 140-2 may remove the artificial intelligence model loaded in the volatile memory 145 prior to changing location from the volatile memory 145, while loading a different artificial intelligence model corresponding to the changed area to perform object recognition. That is, the second processor 140-2 may at the very least load only the artificial intelligence model, from among the plurality of artificial intelligence models 132, required for each area in which the electronic apparatus 100 is located and use the artificial intelligence model.

The first processor 140-1 and the second processor 140-2 may be implemented as one processor or a plurality of processors to perform operations.

Specifically, referring to FIG. 2, the processor 141 including the first processor 140-1 and the second processor 140-2 may determine the area in which the electronic apparatus 100 is located from among the plurality of areas on the map, load at least one model of the plurality of artificial intelligence models 132 based on area information, and use the loaded model to identify the object in the image obtained through the camera 120.

Figure 3A:
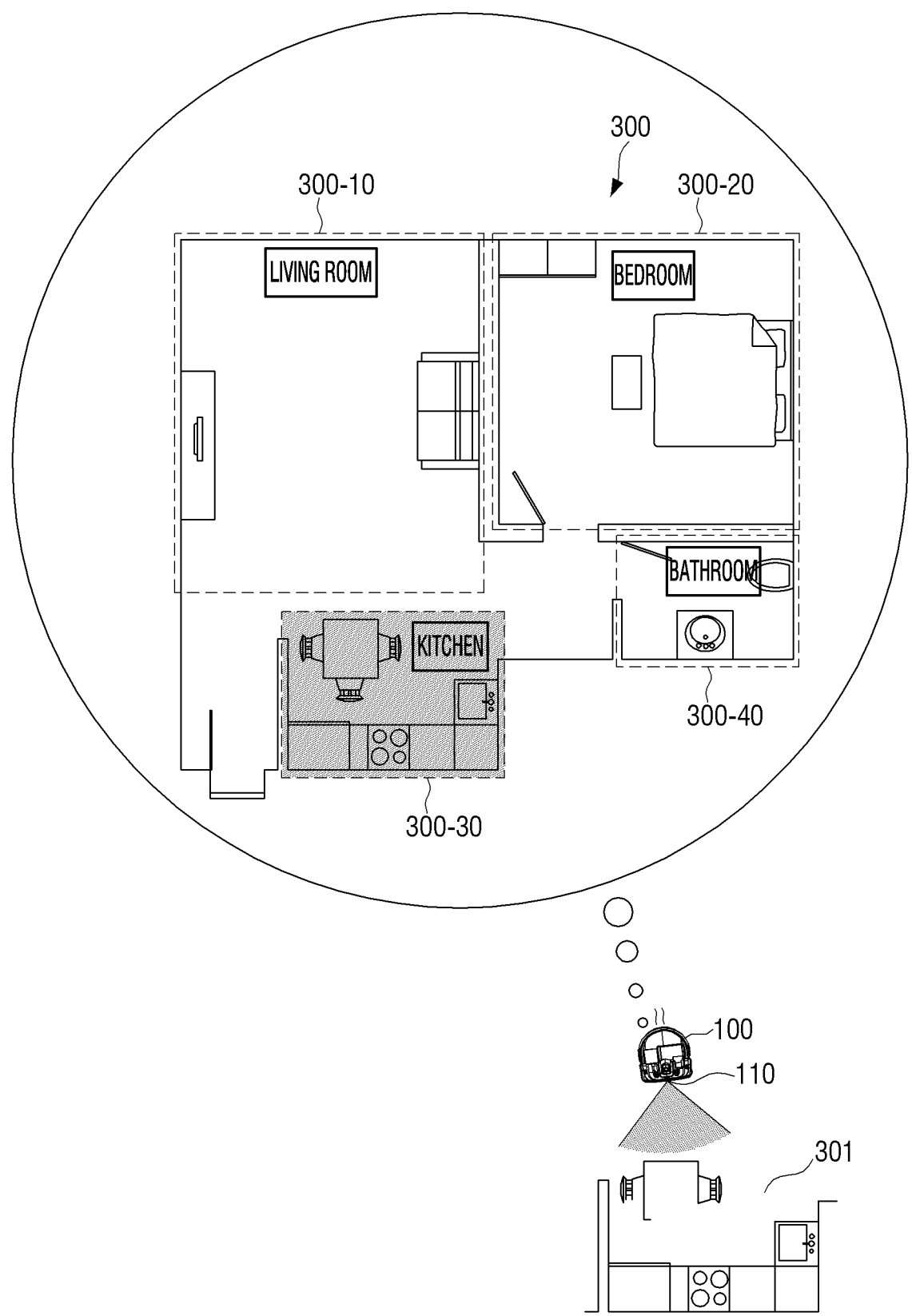
FIG. 3A is a diagram illustrating an embodiment of an electronic apparatus determining an area where an electronic apparatus is located from a plurality of areas.
Figure 3B:
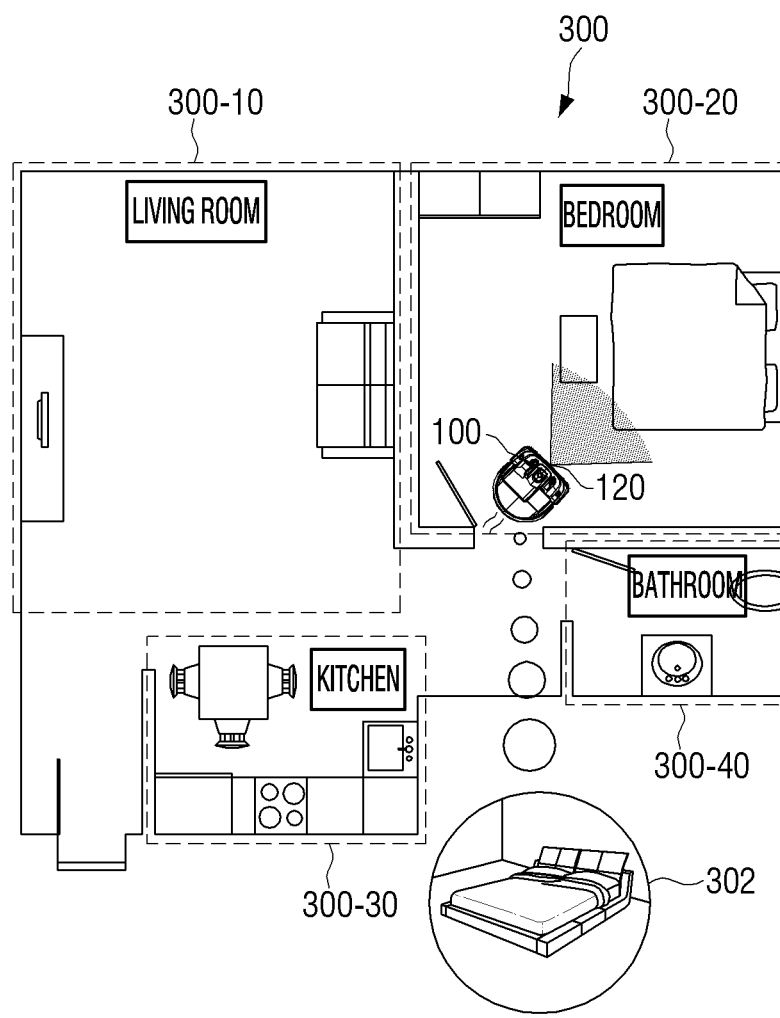
FIG. 3B is a diagram illustrating an embodiment of an electronic apparatus determining an area where an electronic apparatus is located from among a plurality of areas.

FIGS. 3A and 3B are diagrams illustrating an example of an electronic apparatus 100 identifying an area where the electronic apparatus 100 is located from among a plurality of areas.

The first processor 140-1 may use information on the map stored in the storage 130 and sensing data to determine the area in which the electronic apparatus 100 is located.

As a specific example, if the sensor 110 is a LiDAR sensor, the first processor 140-1 may compare sensing data received from the sensor 110 and information on the map stored in the storage 130 to determine the area in which the electronic apparatus 100 is located.

The sensing data may include information on the structure of the surroundings of the electronic apparatus 100. Information on the surrounding structure may include information on the structured object or the shape and/or size of things present in the surroundings.

In this case, the first processor 140-1 may compare information on the structure (i.e., shape and/or size) of the surroundings of the electronic apparatus 100 included in the sensing data with information on the structure (i.e., shape and/or size) of each of the plurality of areas on the map included in the information on the map to determine the area in which the electronic apparatus 100 is located from among the plurality of areas on the map.

Referring to FIG. 3A, the electronic apparatus 100 implemented as a robot cleaner may use sensing data received from the sensor 110 implemented as a LiDAR sensor to identify the surrounding structure 301 based on the distance from the surrounding structured object or the distance from each point (or each of a plurality of points) in the object. Further, the electronic apparatus 100 may identify a point coincident with the identified surrounding structure 301 on the map 300 to determine the location of the electronic apparatus 100 on the map 300. The electronic apparatus 100 may use the determined location and the location of each of the plurality of areas 300-10, 300-20, 300-30, and 300-40 on the map 300 to determine if the electronic apparatus 100 is located in the kitchen 300-30 from among the plurality of areas 300-10, 300-20, 300-30, and 300-40.

The first processor 140-1 may also use data on the surrounding image obtained through the camera 120 to determine which area of the plurality of areas the electronic apparatus 100 is located.

For example, if the information on the map includes data on a three dimensional (3D) image of each of the plurality of areas, the first processor 140-1 may use the result of comparing the image of each of the plurality of areas included in the information on the map with the 3D image obtained through the camera 120 implemented as a 3D camera to determine the area in which the electronic apparatus 100 is located.

Referring to FIG. 3B, the electronic apparatus 100 implemented as a robot cleaner may compare the image 302 obtained through the camera 120 with the interior images of the plurality of areas 300-10, 300-20, 300-30, and 300-40 stored in the storage 130 to determine if the electronic apparatus 100 is located in the bedroom 300-20.

Alternatively, the first processor 140-1 may also identify one or more objects in the image obtained through the camera 120 from the area in which the electronic apparatus 100 is located to determine the area in which the electronic apparatus 100 is located.

As a specific example, the first processor 140-1 may input the image photographed through the camera 120 from the area in which the electronic apparatus 100 is located to at least one of the stored plurality of artificial intelligence models 132 to identify the object in the image. If the identified object is a sofa and a TV, the first processor 140-1 may use pre-set information of one or more objects per area to identify that the sofa and the TV correspond to the "living room."

In addition, the first processor 140-1 may use the sensor 110, which includes an inertia sensor, an acceleration sensor, and the like, to determine the point at which the electronic apparatus 100 is located on the map 300, as well as determine the area including the determined point from among the plurality of areas on the map as the area in which the electronic apparatus 100 is located.

The process of the first processor 140-1 determining the area in which the electronic apparatus 100 is located is not limited to the above-described embodiments, and may be performed by various other methods.

FIG. 4 is a diagram of a table illustrating an example of a plurality of artificial intelligence models stored in a storage 130 of an electronic apparatus 100.

Referring to FIG. 4, in the storage 130, one or more trained artificial intelligence models, such as an air conditioner model 401 trained to identify an air conditioner and a refrigerator model 402 trained to identify a refrigerator, may be stored to respectively identify a corresponding object.

In the storage 130, one or more artificial intelligence models trained to identify a plurality of objects may be stored. Referring to FIG. 4, the bedroom model 410 of the plurality of artificial intelligence models stored in the storage 130 may be a model (or models) capable of identifying objects such as an air conditioner, a TV, a bed, a chair, a cup, and a glass bottle. Referring to FIG. 4, the kitchen model 430 of the plurality of artificial intelligence models stored in the storage 130 may be may be a model (or models) capable of identifying objects such as an air conditioner, a refrigerator, a chair, a cup, a glass bottle, and a plate.

When the first processor 140-1 determines that the electronic apparatus 100 is located in the bedroom, the second processor 140-2 may load the bedroom model 410 to the volatile memory 145. On the other hand, if the first processor 140-1 determines that the electronic apparatus 100 is located in the kitchen, the second processor 140-2 may load the kitchen model 430 to the volatile memory 145.

Although FIG. 4 illustrates the artificial intelligence models 401, 402 . . . trained to identify objects related to "home" and artificial intelligence models 410, 420, 430, 440 . . . stored to correspond to each of the plurality of areas in the "home," an artificial intelligence model for identifying one or more objects included in various places (i.e., libraries, museums, squares, playing fields, etc.) other than the home and a plurality of artificial intelligence models stored to correspond to each of the plurality of areas included in the place other than the home may be stored in the storage 130.

The artificial intelligence model stored in the storage 130 may consist of or include a plurality of neural network layers. Each layer may include a plurality of weighted values, and a calculation of the layer is performed through the calculation results of the previous layer and the calculation of the plurality of weighted values. Examples of the neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-network. Further, the neural network in the disclosure is not limited to the above-described examples, unless otherwise specified.

The artificial intelligence model may consist of or include an ontology-based data structure in which various concepts, conditions, relationships or agreed knowledge is represented in a computer processable form.

The artificial intelligence model stored in the storage 130 may be trained through the electronic apparatus 100 or a separate server/system through various learning algorithms. The learning algorithm may be a method that trains a predetermined target device (e.g., robot) so that the predetermined target device is able to determine or predict on its own using multiple training data. Examples of the learning algorithm may include supervised learning, unsupervised learning, semi-supervised learning, or reinforcement learning. It is understood that the learning algorithm in the disclosure is not limited to the above-described examples, unless otherwise specified.

The form/type of the artificial intelligence model is not limited to the above-described examples.

Each of the plurality of artificial intelligence models stored in the storage 130 may include a convolutional layer and a fully-connected layer trained to identify at least one object based on characteristic information extracted through the convolutional layer.

In this case, the convolution layer may be a common layer in the plurality of artificial intelligence models 132 stored in the storage 130, and the fully-connected layer may be a layer individually provided to each of the plurality of artificial intelligence models 132.

Each of the fully-connected layers consisting of or including the plurality of artificial intelligence models may be a layer trained to identify at least one object from characteristic information output from the convolutional layer. In this case, each of the fully-connected layers may also output probability values of at least one object being included in the related image for each object.

As a specific example of the electronic apparatus 100 using an artificial intelligence model including a convolutional layer and a fully-connected layer to perform object recognition, the second processor 140-2 may input an image obtained through the camera 120 to the convolution layer. When characteristic information output through the convolution layer is then input to the fully-connected layer, the second processor 140-2 may use data output through the fully-connected layer to obtain the probability of a predetermined object being included in the image.

The first processor 140-1 and the second processor 140-2 may, based the obtained probability being greater than a threshold value when comparing the obtained probability with the threshold value, identify that the predetermined object is included in the input image.

Figure 5:
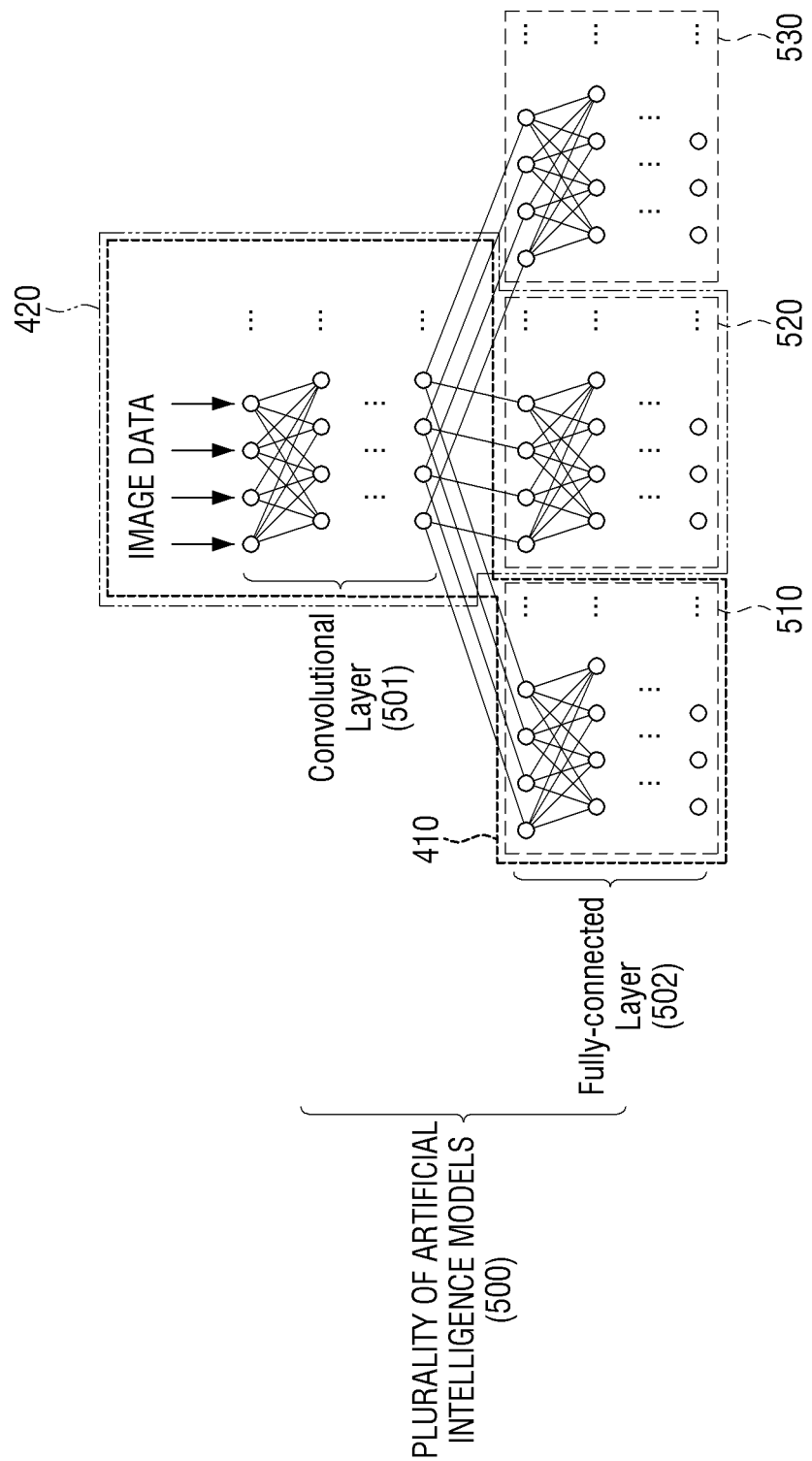
FIG. 5 is a diagram illustrating a specific example of selectively loading an artificial intelligence model corresponding to a determined area from among a plurality of artificial intelligence models consisting of a convolutional layer and a fully-connected layer.

FIG. 5 is a diagram illustrating a specific example of selectively loading an artificial intelligence model corresponding to an identified area from among a plurality of artificial intelligence models consisting of or including a convolutional layer and a fully-connected layer.

In FIG. 5, the plurality of artificial intelligence models as illustrated and described through FIG. 4 being stored in the storage 130 may be assumed. Referring to FIG. 4, the plurality of artificial intelligence models stored in the storage 130 may include a bedroom model 410, a living room model 420, a kitchen model 430, and the like.

Referring to FIG. 5, the plurality of artificial intelligence models 500 stored in the storage 130 may consist of or include the convolutional layer 501 extracting characteristic information when (or based on) data on an image is input and the fully-connected layer 502 trained to identify one or more objects when the extracted characteristic information is input.

Referring to FIG. 5, the fully-connected layer 502 may be divided into a plurality of mutually independent fully-connected layers 510, 520, 530 . . . . The mutually independent fully-connected layers 510, 520, 530 . . . may be layers trained to identify one or more objects different from one another when (or based on) extracted characteristic information is input.

The bedroom model 410 of FIG. 4 may include the convolutional layer 501 and the fully-connected layer 510 of FIG. 5, the living room model 420 of FIG. 4 may consist of the convolutional layer 501 and the fully-connected layer 520 of FIG. 5, and the kitchen model 430 of FIG. 4 may consist of the convolutional layer 501 and the fully-connected layer 530 of FIG. 5.

That is, the plurality of artificial intelligence models 410, 420, 430 . . . of FIG. 4 may commonly use the convolutional layer 501 while being divided from one another through the fully-connected layers 510, 520, 530 . . . trained to identify objects different from one another.

The second processor 140-2 may load the convolutional layer and the fully-connected layer of the artificial intelligence model corresponding to the determined area to the volatile memory 145.

For example, based on determining that the electronic apparatus 100 is located in the "bedroom," the second processor 140-2 may load the convolutional layer 501 and the fully-connected layer 510 to the volatile memory 145 to use the bedroom model 410.

The plurality of artificial intelligence models 500 including a first model corresponding to a first area of a plurality of areas and a second model corresponding to a second area of a plurality of areas may be assumed.

The second processor 140-2 may, based on the electronic apparatus 100 being located at the first area, load the convolutional layer and the fully-connected layer corresponding to the first model to the volatile memory 145, and based on the electronic apparatus 100 being located at the second area, load the convolutional layer and the fully-connected layer corresponding to the second model to the volatile memory 145.

For example, based on determining that the electronic apparatus 100 is located in the "bedroom," the second processor 140-2 may load the convolutional layer 501 and the fully-connected layer 510. If the location of the electronic apparatus 100 is determined as having changed to the "living room," the second processor 140-2 may maintain the convolutional layer 501 in a loaded state and load a new fully-connected layer 520 after removing the fully-connected layer 510 from the volatile memory 145.

The information of the map stored in the storage 130 may be generated/updated by the first processor 140-1.

FIGS. 6A to 6D are diagrams illustrating various examples of an electronic apparatus 100 generating information on a map.

The first processor 140-1 may obtain information on the structure of the place the electronic apparatus 100 is located based on sensing data received from the sensor 110.

Referring to FIG. 6, the first processor 140-1 may control a moving means or mechanism of the electronic apparatus 100 for the electronic apparatus 100 to move within the related place. While the electronic apparatus 100 is in movement, the first processor 140-1 may then use sensing data received through the sensor 110, which is a LiDAR sensor, to obtain information on the structure(s) of the related place.

In this case, the first processor 140-1 may use sensing data received through the sensor 110, which may be a LiDAR sensor, to identify the distance(s) from the surrounding structured object(s) of the electronic apparatus 100 and the distance from the points in the object(s), and obtain information on the surrounding structure (i.e., shape and/or size) based on the identified distance.

In addition, the first processor 140-1 may obtain data on the image photographed through the camera 120, which may be implemented as a 3D camera, while the electronic apparatus 100 is in movement. The first processor 140-1 may then obtain information on the structure (i.e., shape and/or size) of the related place using the obtained image.

Figure 6A:
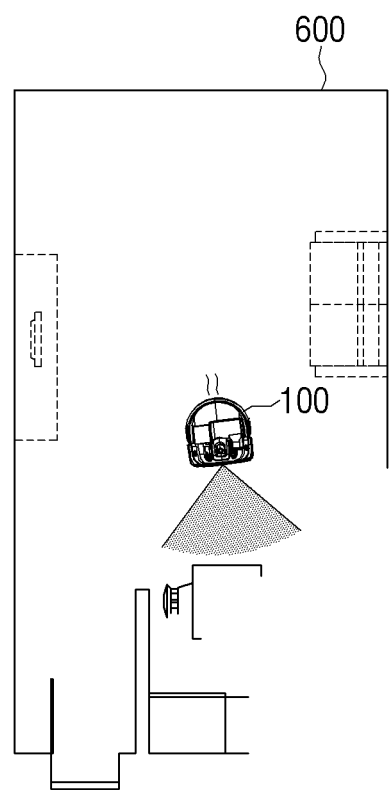
FIG. 6A is a diagram illustrating an example of an electronic apparatus generating a first dimensional map through a LiDAR sensor.

Referring to FIG. 6A, the first processor 140-1 may use information on the obtained structure to obtain image data relating to a first dimensional map 600, which appears as if a part or whole of the related place is viewed from a specific direction.

The first processor 140-1 may, based on information on the obtained structure, divide the place in which the electronic apparatus 100 is located to a plurality of areas.

In this case, the first processor 140-1 may use various algorithms to divide the plurality of areas of the map. For example, the first processor 140-1 may identify a point where there is a dividing line or a protrusion (or a threshold)

on a floor, a point where a movable width becomes narrow, a point where there is a wall, a point where a wall ends, a point where there is a door, and the like through sensing data obtained through the sensor 110, which may be a LiDAR sensor, and/or images obtained through the camera 120. The first processor 140-1 may divide each area on the map by using the identified points as demarcations between areas.

Figure 6B:
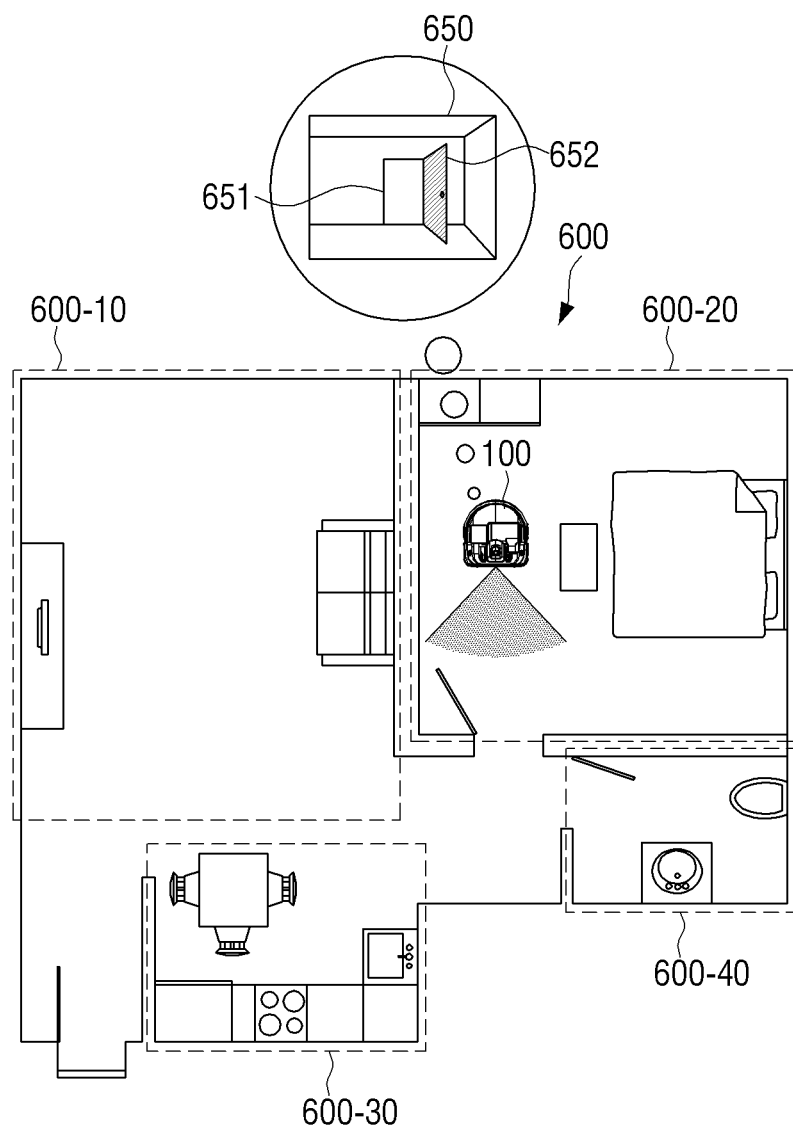

In FIG. 6B, the first processor 140-1 may determine the location of the electronic apparatus 100 on the first dimensional map 600 through the image (e.g., 3D image) obtained through the sensing data obtained through a LiDAR sensor included in the sensor 110 and/or the camera 120.

The first processor 140-1 may then use sensing data obtained through the LiDAR sensor to identify the "point where a wall ends." In addition, the first processor 140-1 may control the second processor 140-2 to input the image 650 (e.g., RGB image) obtained through the camera 120 to at least one of the plurality of artificial intelligence models stored in the storage 130 to identify "point where a wall ends" 651, "door" 652, and the like included in the image 650.

The first processor 140-1 may use the above-described points 651 and 652 and the structure of the wall to divide/define one independent area 600-20 including the point where the electronic apparatus 100 is currently located, on the first dimensional map 600. The first processor 140-1 may then use other various algorithms in addition thereto to respectively divide the remaining areas 600-10, 600-30 and 600-40, on the first dimensional map 600.

It is understood, however, that dividing the place in which the electronic apparatus 100 is located to a plurality of areas is not limited only to the above-described embodiments, and various other methods and/or devices may be implemented in one or more other embodiments.

The first processor 140-1 may generate information on the map including information on the structures of each of the divided plurality of areas and store (or control to store) the information on the generated map in the storage 130.

The first processor 140-1 may generate/store information on a map including an interior image of each divided area and information on the characteristics of each divided area. The characteristics of each divided area may relate to a purpose, a size, and the like of each area.

The first processor 140-1 may add, to the information on the map, an interior image of each of the plurality of areas obtained through the camera 120 while the electronic apparatus 100 is positioned at each of the divided plurality of areas.

For example, the first processor 140 may obtain multi-angled images obtained through the camera 120 each time the electronic apparatus 100 is located at each of the various points on the plurality of areas, and may store the obtained multi-angled images as information on the map.

The second processor 140-2 may input the image obtained through the camera 120 while the electronic apparatus 100 is located at each of the divided plurality of areas to at least one of the plurality of artificial intelligence models stored in the storage 130 to identify the object located at each of the plurality of areas. The first processor 140-1 may then obtain information on the objects identified as located at each of the plurality of areas as information on objects present at each of the plurality of areas and store the obtained information in the storage 130.

The information on objects present at each of the plurality of areas may be information related to at least one output of the plurality of artificial intelligence models. That is, the information on the objects may include the result (i.e., name, size, type, etc., of the identified object) of the at least one artificial intelligence model, of the plurality of artificial intelligence models 132 stored in the storage 130, identifying an object by receiving input of the images obtained from the plurality of areas, and outputting information on the identified object. The information on the objects may also include information on an identity of a person if the object is a person.

As information on objects may be pre-stored for each of the plurality of areas, the information on the objects present at each of the plurality of areas may be stored/matched to match the information output by the plurality of artificial intelligence models to identify at least one object. The information on the objects present at each of the plurality of areas may be classified and managed by categories such as name and type (i.e., home appliance, furniture, gym equipment, etc.) for searching/processing convenience of each of the artificial intelligence models.

The first processor 140-1 may use information on the objects present at each of the plurality of areas to identify the purpose of each of the plurality of areas.

Figure 6C:
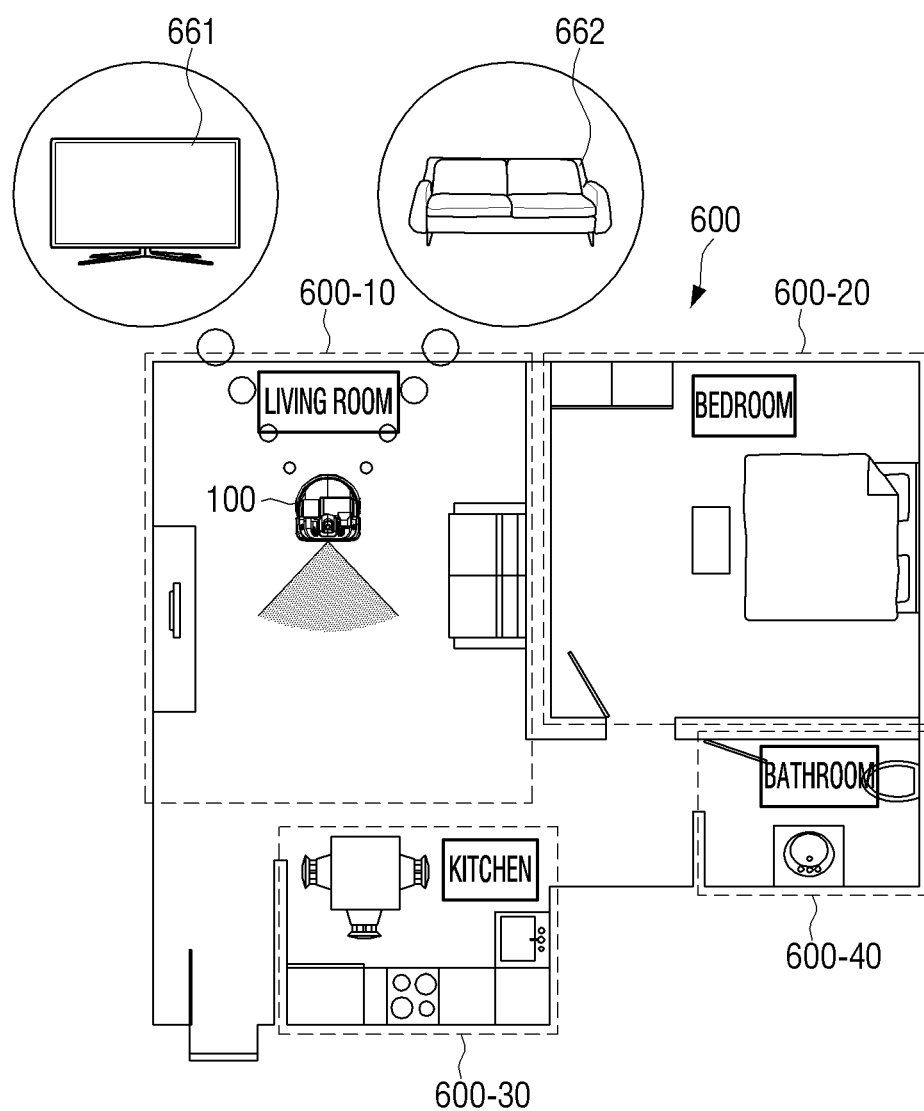
FIG. 6C is a diagram illustrating an example of an electronic device recognizing objects in each divided area to identify use in each of the identified plurality of areas.

Referring to FIG. 6C, the first processor 140-1 may control the second processor 140-2 to input, to the one or more artificial intelligence models stored in the storage 130, one or more images, obtained through the camera 120, of an area 600-10 while the electronic apparatus 100 is located in the related area 600-10.

Accordingly, the first processor 140-1 and the second processor 140-2 may identify that a TV 661 and a sofa 662 are located in the area 600-10. The first processor 140-1 may then use the object information for each pre-stored area so that the one or more objects correspond to each of the one or more areas such as "living room," "kitchen," and "bedroom" to identify the area corresponding to a TV 661 and a sofa 662 as the "living room." The first processor 140-1 may then identify that the purpose or identity of the area 600-10 is the "living room."

The first processor 140-1 may then use objects identified in each of the remaining areas 600-20, 600-30 and 600-40 to identify that the purpose or identity of the remaining areas 600-20, 600-30 and 600-40 are the "bedroom," the "kitchen," and the "bathroom," respectively.

The first processor 140-1 may divide each area or obtain information on each area according to a user input received from the electronic apparatus 100.

For example, when an image corresponding to the first dimensional map generated through sensing data of the sensor 110, which is a LiDAR sensor, is displayed on a display of the electronic apparatus 100, the first processor 140-1 may divide the image corresponding to the first dimensional map to a plurality of areas according to a touch input of a user for at least some zones included in the image of the displayed first dimensional image.

In addition, when the image corresponding to the first dimensional map divided into the plurality of areas is displayed on the display of the electronic apparatus 100, the first processor 140-1 may identify the purpose or identity of the at least one area of the plurality of areas divided according to the touch input of the user selecting at least one of the divided plurality of areas and the touch input of the user selecting/inputting the purpose of the selected area.

The user input for dividing each area or defining the information (e.g., purpose) on each area may not only be directly received in the electronic apparatus 100, but also indirectly received through an external apparatus such as a smartphone and a PC. In this case, the information on user input received through the external apparatus may be received by the electronic apparatus 100 from the external apparatus.

Figure 6D:
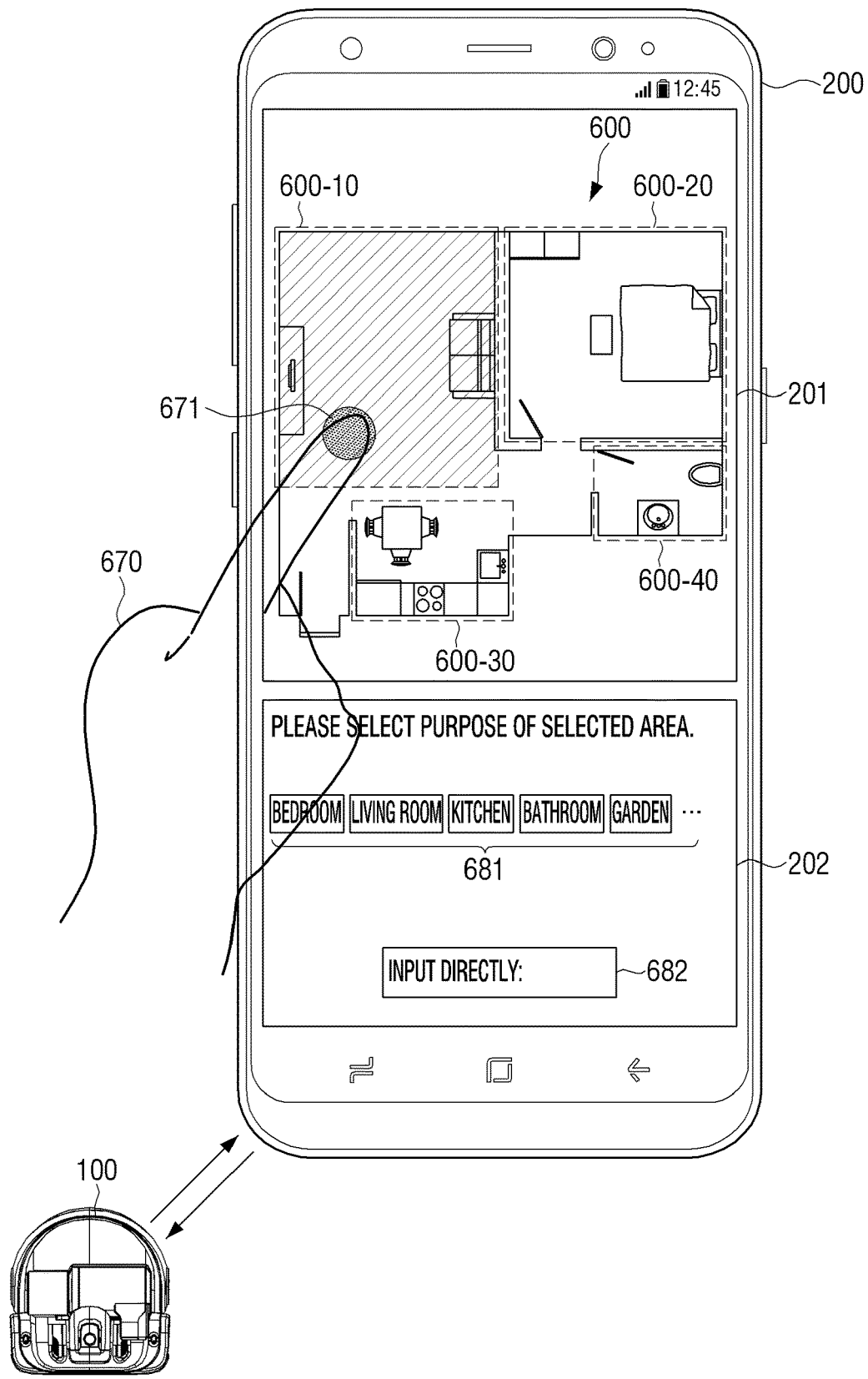
FIG. 6D is a diagram illustrating an example of an electronic apparatus identifying purpose of each area of the divided plurality of areas through communication with an external apparatus.

For example, FIG. 6D is a diagram illustrating an electronic apparatus 100 identifying the purpose of the plurality of areas on the first dimensional map according to a user input received through the external apparatus 200.

Referring to FIG. 6D, the electronic apparatus 100, which is a robot cleaner, may transmit information on the first dimensional map 600 divided into a plurality of areas to the external apparatus 200 after performing the processes as in FIGS. 6A and 6B.

Referring to FIG. 6D, the external apparatus 200 may display the first dimensional map 600 received in a first zone 201 on a screen.

As shown in FIG. 6D, when (or based on) the touch of the user 670 on the some zones 671 of the area 600-10 of the plurality of areas 600-10, 600-20, 600-30 and 600-40 divided on the first dimensional map 600 is input, the external apparatus 200 may identify the area 600-10 as having been selected. In this case, the external apparatus 200 may visually indicate that the related area 600-10 has been selected by adjusting the color of the zone included in the selected area 600-10.

The external apparatus 200 may then display a graphical user interface (GUI) for receiving input of the purpose of the selected area 600-10 to a second zone 202 on the screen.

Referring to FIG. 6D, the GUI on the second zone 202 may include a plurality of menu items 681 that the user may select for the purpose of the area 600-10. In addition, the GUI on the second zone 202 may also include an item 682 for the user to directly input the purpose of the area 600-10. When the touch of the user on the related item 682 is input, a keyboard for the user to input a text may be displayed on the screen of the external apparatus 200.

The external apparatus 200 may then transmit information on the selected area 600-10 and information on the purpose selected/input by the GUI to the electronic apparatus 100.

The electronic apparatus 100 may then identify the purpose of the selected area 600-10 among the plurality of areas divided on the first dimensional map 600 through the received information.

The configuration of the screen, the form (i.e., touch) of receiving user input, and the like illustrated and described through FIG. 6D are merely an example, and various technical methods that are generally known may be applicable in addition thereto. Further, although FIG. 6D illustrates receiving a user input when the first dimensional map 600 has already been divided into a plurality of areas, receiving a user input to divide the first dimensional map 600 to a plurality of areas through the external apparatus may also be possible in various embodiments.

The electronic apparatus may newly define/obtain the plurality of artificial intelligence models corresponding to each of the plurality of areas divided through the process of FIG. 6B and/or FIG. 6C. To this end, the electronic apparatus may use the artificial intelligence model trained to identify the plurality of objects that is pre-stored in the storage.

Specifically, when an artificial intelligence model trained to identify a plurality of objects is stored in the storage 130, the second processor 140-2 may input an image obtained through the camera 120 while the electronic apparatus 100 is located at each of the plurality of areas to the artificial intelligence model to identify objects present at each of the plurality of areas. Although the process may be performed separate from the process of FIG. 6C where an object is identified in the place the electronic apparatus is located, the process may also be performed together with the process of FIG. 6C.

Further, the second processor 140-2 may transfer (or provide) information on the identified object to the first processor 140-1. In this case, the first processor 140-1 may, based on information on the identified object transferred from the second processor 140-2, obtain the artificial intelligence model corresponding to each of the plurality of areas from the stored artificial intelligence models.

Figure 7B:
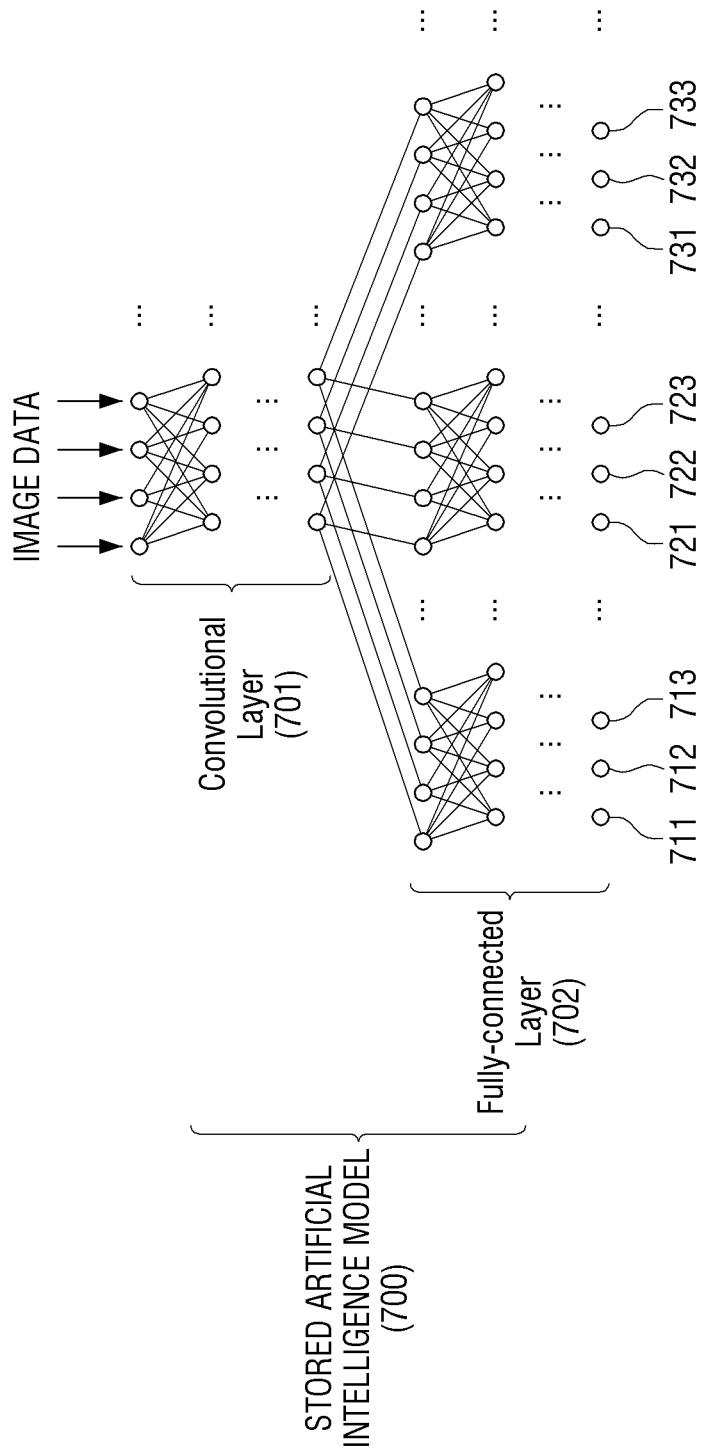
FIG. 7B is diagram illustrating an example of an electronic apparatus obtaining an artificial intelligence model corresponding to each of a plurality of areas using an object located in each of a plurality of areas.
Figure 7C:
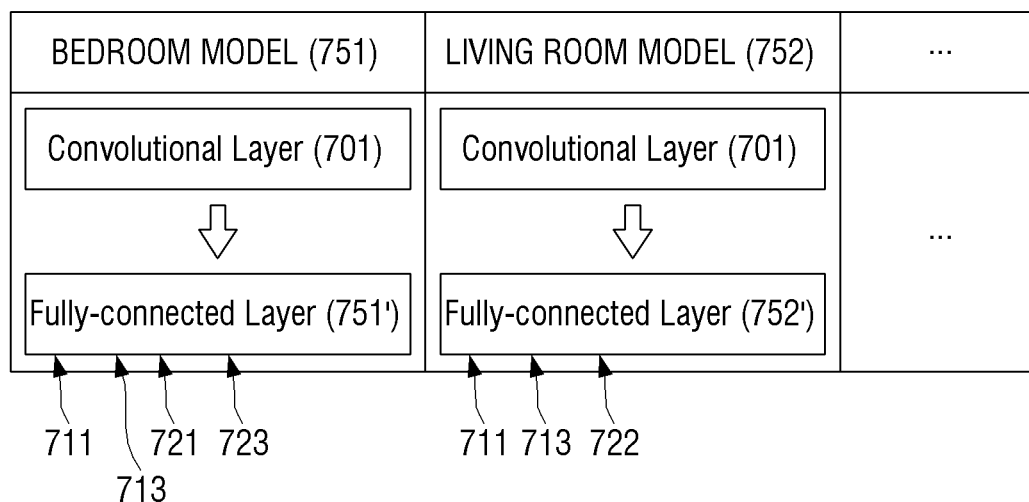
FIG. 7C is diagram illustrating an example of an electronic apparatus obtaining an artificial intelligence model corresponding to each of a plurality of areas using an object located in each of a plurality of areas.

FIGS. 7A to 7C are diagrams illustrating an example of an electronic apparatus 100 obtaining an artificial intelligence model corresponding to each of a plurality of areas using an object identified in each of the plurality of areas.

FIG. 7A is a diagram of a table briefly illustrating information on the objects identified at each of the plurality of areas being stored in the storage 130 as information on objects present at each of the plurality of areas.

Referring to FIG. 7A, an air conditioner 11, a TV 13, a bed 21, a chair 23 and the like are present in the bedroom 51, and an air conditioner 11, a TV 13, a sofa 22, and the like are present in the living room 52.

FIG. 7B is a diagram illustrating a data structure of an artificial intelligence model 700 stored in the storage 130 prior to obtaining the plurality of artificial intelligence models corresponding to each of the plurality of areas.

Referring to FIG. 7B, the artificial intelligence model 700 may be composed as a fully-connected layer 702 for identifying a plurality of objects using a convolutional layer 701 and characteristic information extracted from the convolutional layer 701.

FIG. 7B is a diagram illustrating a node 711 outputting the probability of an air conditioner being included in the input image, a node 712 outputting the probability of a refrigerator being included in the input image, a node 713 outputting the probability of a TV being included in the input image, a node 721 outputting the probability of a bed being included in the input image, a node 722 outputting the probability of a sofa being included in the input image, and a node 723 outputting the probability of a chair being included in the input image. Additionally, node 731, node 732, and node 733 are nodes respectively related to a cup, a glass bottle, and a plate.

The first processor 140-1 may, based on information on the objects present at a first area from information on objects present at each of the plurality of areas stored in the storage 130, identify that a first object is present at the first area.

In this case, the first processor 140-1 may identify a part of the fully-connected layer trained to identify the first object of the fully-connected layer of the artificial intelligence model stored in the storage 130.

The first processor 140-1 may then obtain (define) a first model including a part of the identified fully-connected layer and the convolutional layer of the artificial intelligence model stored in the storage 130 and store the first model in the storage 130. In this case, the first processor 140-1 may generate logical mapping information connecting (matching) the first model with the first area and store the generated information in the storage 130.

The first processor 140-1 may, based on information on an object present in a second area from information on objects present at each of the plurality of areas stored in the storage 130, identify that a second object is present at the second area.

The first processor 140-1, in this case, may identify a different part of the fully-connected layer trained to identify the second object from the fully-connected layer of the artificial intelligence model stored in the storage 130.

The first processor 140-1 may then obtain (define) a second model including a different part of the identified fully-connected layer and the convolutional layer of the artificial intelligence model stored in the storage 130 and store the second model in the storage 130. In this case, the first processor 140-1 may generate logical mapping information connecting (matching) the second model with the second area and store the generated information in the storage 130.

For example, the first processor 140-1 may use information in FIG. 7A to identify that an air conditioner 11, a TV 13, a bed 21, a chair 23, and the like are present in the "bedroom" 51.

The first processor 140-1 may define a new fully-connected layer 751' including the nodes 711, 713, 721 and 723 related to the air conditioner 11, the TV 13, the bed 21, and the chair 23 and the part used in an inference process to generate an output of the corresponding nodes 711, 713, 721 and 723 from the fully-connected layer 702 illustrated in FIG. 7B.

Although the fully-connected layer 751' may be related to the inference process for generating output of the node 712 related to the refrigerator of the fully-connected layer 702, the fully-connected layer 751' may not include parts unrelated to the inference process for generating output of nodes 711 and 713 related to the air conditioner 11 and the TV 13.

Further, referring to FIG. 7C, the first processor 140-1 may obtain a new bedroom model 751 including the convolutional layer 701 and the fully-connected layer 751'.

For example, the first processor 140-1 may use information of FIG. 7A to identify that an air conditioner 11, a TV, 13, a sofa 22, and the like are present in the "living room" 52.

The first processor 1140-1 may define/obtain a new fully-connected layer 752' including the nodes 711, 713 and 722 related to the air conditioner 11, the TV 13, the sofa 22 and the part used in the inference process to generate an output of the corresponding nodes 711, 713, and 722 from the fully-connected layer 702 illustrated in FIG. 7B.

Although the fully-connected layer 752' may be related to the inference process for generating output of the node 721 related to the bed 21 of the fully-connected layer 702, the fully-connected layer 752' may not include parts unrelated to the inference process for generating output of the node 722 related to the sofa 22.

Referring to FIG. 7C, the first processor 140-1 may obtain a living room model 752 including the convolutional layer 701 and the fully-connected layer 752'.

The first processor 140-1 may then store the obtained artificial intelligence model in the storage 130 among artificial intelligence models corresponding to each area.

The first processor 140-1 may store the logical mapping information that maps the fully-connected layer 751' included in the bedroom model 751 of the fully-connected layer 702 with the bedroom 51 in the storage 130. In addition, the first processor 140-1 may store the logical mapping information that maps the fully-connected layer 752' included in the living room model 752 of the fully-connected layer 702 with the living room 52 in the storage 130.

If, for example, the electronic apparatus 100 is determined as being located in the bedroom 51, the second processor 140-2 may then load only the bedroom model 751 of the artificial intelligence models 700 stored in the storage 130 to the volatile memory 145 according to the control of the first processor 140-1. Specifically, the second processor 140-2 may load the fully-connected layer 751' that is mapped with the logical mapping information related to the bedroom 51 together with the convolutional layer 701.

Alternatively, if, for example, the electronic apparatus 100 is determined as being located in the living room 52, the second processor 140-2 may load only the living room model 752 of the artificial intelligence models 700 stored in the storage 130 to the volatile memory 145 according to the control of the first processor 140-1. Specifically, the second processor 140-2 may load the fully-connected layer 752' that is mapped with the logical mapping information related to the living room 52 together with the convolutional layer 701.

In addition to the process of FIG. 6C of identifying an object present in the place in which the electronic apparatus 100 is located while generating information on the map, the first processor 140-1 may perform scanning identifying objects present at each of the plurality of areas. In this case, the first processor 140-1 may control a moving means or mechanism (e.g., wheels) of the electronic apparatus 100 to move around on the plurality of areas while controlling the second processor 140-2 to identify objects present at each of the plurality of areas from the image obtained through the camera 120 at each of the plurality of areas.

The first processor 140-1 may either perform scanning according to received user command, or may perform the above-described scanning according to a pre-set interval regardless of user command.

In addition, the first processor 140-1 may only perform the above-described scanning when there is no user in the place including the plurality of areas. In this case, the first processor 140-1 may identify that there is no user at the corresponding place through the received user input. In addition, the first processor 140-1 may control the second processor 140-2 to recognize whether a user is present through an image obtained through the camera 120 at the plurality of areas, and identify that no user is present at the corresponding place based on the output of the artificial intelligence model loaded by the second processor 140-2. In this case, the artificial intelligence model may be an artificial intelligence model trained to identify whether a user is included in the input image.

The electronic apparatus 100 may update the artificial intelligence model corresponding to each of the plurality of areas according to the scanning results on the plurality of areas.

Specifically, the second processor 140-2 may input the image obtained through the camera 120 while the electronic apparatus 100 is located at one area of the plurality of areas to at least one of the plurality of artificial intelligence models loaded in the volatile memory 145 to identify the object present in the corresponding area, and may transfer information on the identified object to the first processor. In this case, the plurality of artificial intelligence models may not be loaded simultaneously in the volatile memory 145, but may be loaded sequentially by one or two models at a time.

The first processor 140-1 may then update the artificial intelligence model corresponding to the related area based on information of the identified object transferred from the second processor 140-2.

For example, when information on the objects present at each of the plurality of areas is stored, the first processor 140-1 may, based on information on the objects present at each of the plurality of areas stored in the storage 130, determine at least one object present at the one area of the plurality of areas, and based on information on the identified object from the corresponding area transferred from the second processor 140-2, determine the unidentified object in the corresponding area from the determined objects.

The first processor 140-1 may then remove the trained part to identify the unidentified object from the artificial intelligence models corresponding to the related area of the plurality of artificial intelligence models to update the artificial intelligence model corresponding to the related area.

Figure 8A:
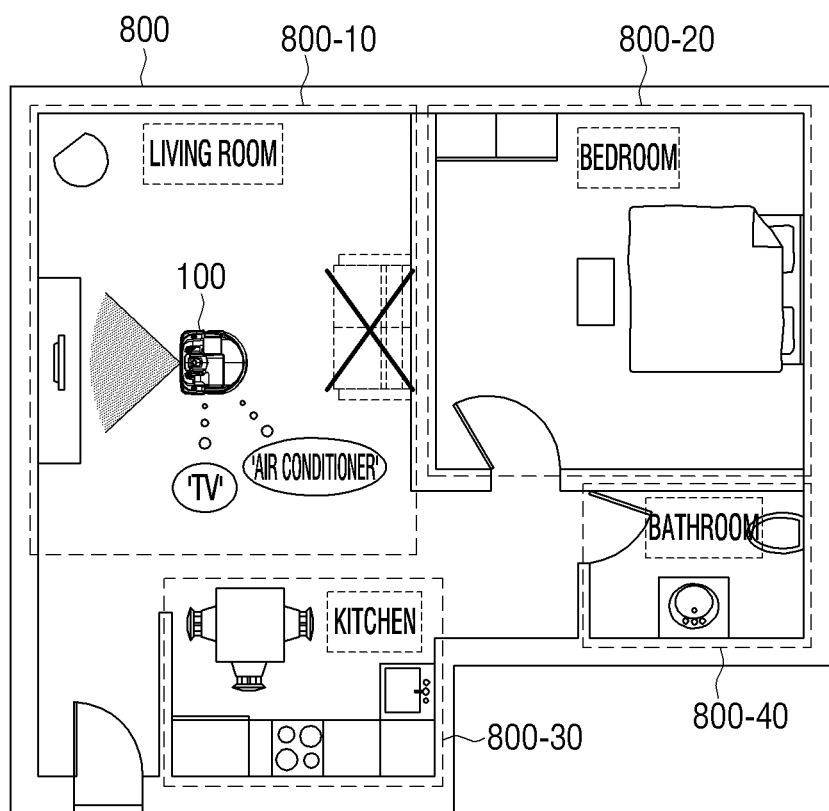
FIG. 8A is a diagram illustrating an example of an electronic apparatus updating an artificial intelligence model corresponding to a related area in case an object located at one area of a plurality of areas is identified as not being located at the related area any longer.
Figure 8B:
FIG. 8B is a diagram illustrating an example of an electronic apparatus updating an artificial intelligence model corresponding to a related area in case an object located at one area of a plurality of areas is identified as not being located at the related area any longer.
Figure 8C:
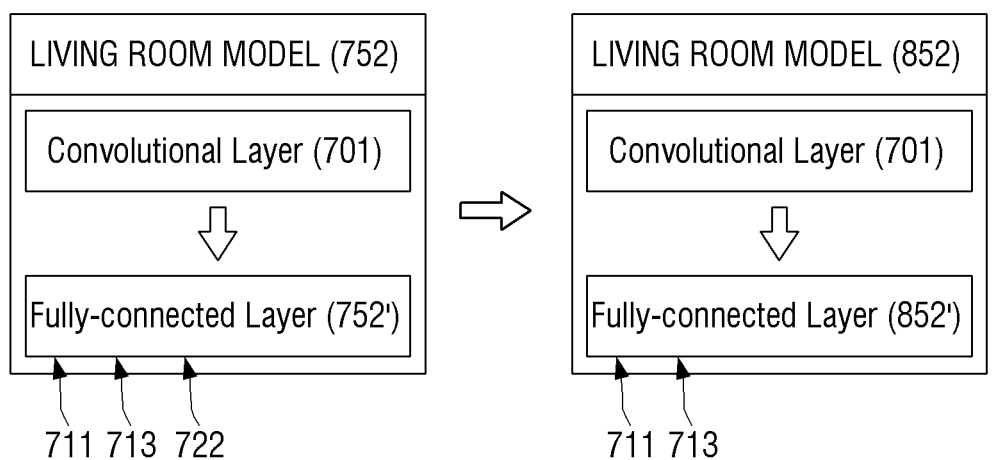
FIG. 8C is a diagram illustrating an example of an electronic apparatus updating an artificial intelligence model corresponding to a related area in case an object located at one area of a plurality of areas is identified as not being located at the related area any longer.

FIGS. 8A to 8C are diagrams illustrating an example of an electronic apparatus 100 updating an artificial intelligence model corresponding to a related area in case an object present in one area of a plurality of areas is identified as not being present at the related area any longer.

FIGS. 8A to 8C illustrate an example of information on objects present at each of the plurality of areas being stored in the storage 130 as in FIG. 7A. The information on the objects present at each of the plurality of areas stored in the storage 130 may be pre-set information or may be information on the objects identified at each of the plurality of areas through the process of FIG. 6C. In addition, FIGS. 8A to 8C illustrate an example of the plurality of artificial intelligence models corresponding to each of the plurality of areas being composed as in FIG. 7C and stored in the storage 130.

Referring to FIG. 8A, the first processor 140-1 of the electronic apparatus 100 implemented as a robot cleaner may control a moving means or mechanism (device) of the electronic apparatus 100 so that the electronic apparatus 100 may move around a plurality of areas 800-10, 800-20, 800-30 and 800-40 on the place indicated by a map 800.

Further, while the electronic apparatus 100 is located at each of the plurality of areas 800-10, 800-20, 800-30 and 800-40, the second processor 140-2 may load at least one of the plurality of artificial intelligence models stored in the storage 130, and input an image obtained through the camera 120 to the loaded artificial intelligence model to identify the object located at each of the plurality of areas.

To this end, the first processor 140-1 may control the movement of the electronic apparatus 100 to pass all of the plurality of areas 800-10, 800-20, 800-30 and 800-40 at least one or more times.

Referring to FIG. 8 the electronic apparatus 100 may identify an "air conditioner" 11 and a "TV" 13 in the "living room" 800-10. However, referring to FIG. 8A, because the "sofa" 22 that previously was present in the "living room" 800-10 is no longer present in the "living room" 800-10, the electronic apparatus 100 may no longer be able to identify the "sofa" 22 in the "living room" 800-10.

When the "sofa" 22 is no longer identified in the "living room" 800-10, for example, when the "sofa" 22 is not identified in the "living room" 800-10 for a threshold time (e.g., threshold time may be variously preset to two days, one week, etc.), the first processor 140-1 may update information on the objects present in the "living room" 52 from the information on the objects present at each of the plurality of areas stored in the storage 130.

Accordingly, referring to FIG. 8B, information on the objects present in the "living room" 52 stored in the storage 130 may be updated so as to not include the "sofa" 22 anymore.

In this case, referring to FIG. 8C, the first processor 140-1 may obtain an artificial intelligence model 852 with the part trained to identify the "sofa" 22 of the fully-connected layer 702 removed or obtained from the artificial intelligence model 752 corresponding to "living room" 52.

The part trained to identify the "sofa" 22 may refer to the part used in the inference process to generate an output of the node 722 on the "sofa" 22 of the fully-connected layer 702. However, although the part may be used in the inference process to generate an output of the node 722, the first processor 140-1 may not remove the related part if the part is also used in the inference process to generate an output of nodes related to an "air conditioner" 11 and a "TV" 13.

The first processor 140-1 may then update (or remove) an artificial intelligence model 852 that is obtained from the artificial intelligence model 752 corresponding to the "living room" 52 to store in the storage 130.

When (or based on) information on objects present at each of the plurality of areas is stored in the storage 130, the first processor 140-1 may, based on information on the objects present at each of the plurality of areas stored in the storage 130, determine at least one object present at one area of the plurality of areas. Further, based on information on the identified object from the related area transferred from the second processor 140-2, the first processor 140-1 may determine the object not included among the determined at least one object of the identified objects from the related area.

In this case, the first processor 140-1 may add a fully-connected layer trained to identify the object not included among the determined at least one object to the artificial intelligence model corresponding to the related area from among the plurality of artificial intelligence models to update the artificial intelligence model corresponding to the related area.

Figure 9A:
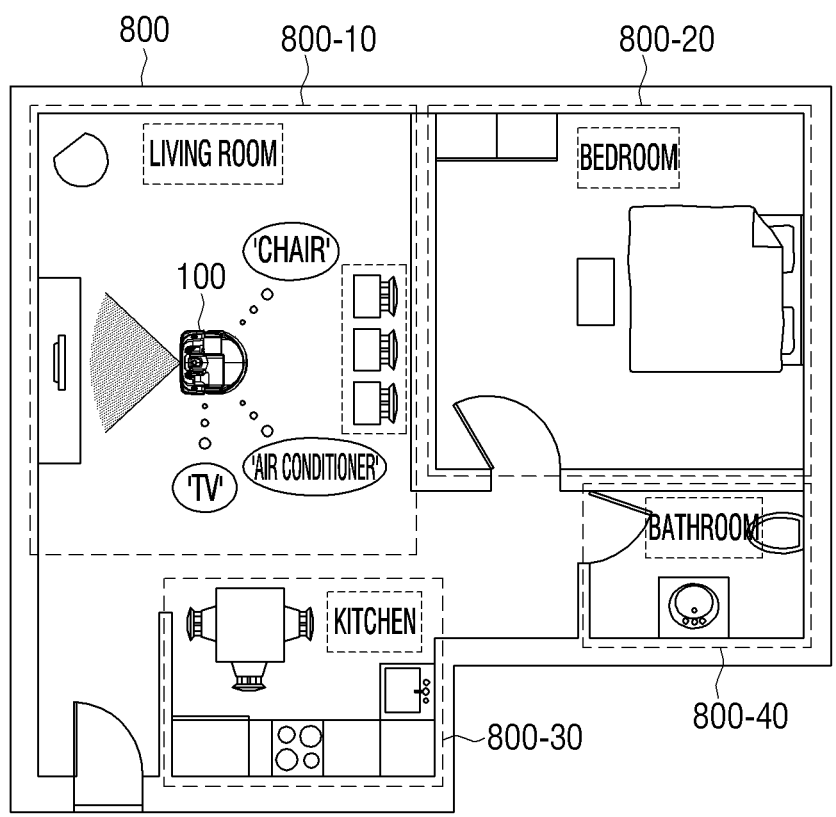
FIG. 9A is a diagram illustrating an example of an electronic apparatus updating an artificial intelligence model corresponding to a related area in case a new object is identified as being added to one area of a plurality of areas.
Figure 9B:
FIG. 9B is a diagram illustrating an example of an electronic apparatus updating an artificial intelligence model corresponding to a related area in case a new object is identified as being added to one area of a plurality of areas.
Figure 9C:
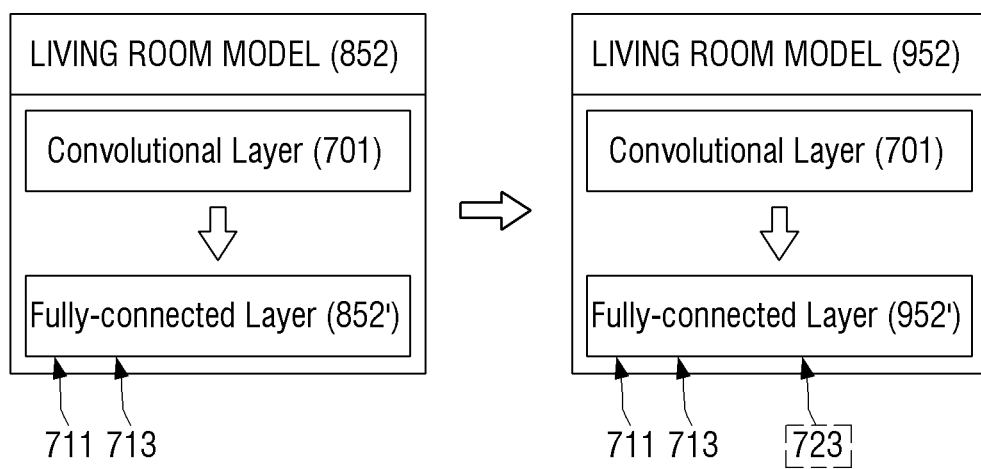
FIG. 9C is a diagram illustrating an example of an electronic apparatus updating an artificial intelligence model corresponding to a related area in case a new object is identified as being added to one area of a plurality of areas.

FIGS. 9A to 9C are diagrams illustrating an example of updating an artificial intelligence model corresponding to a related area in case a new object is identified as being added to one area of a plurality of areas.

The embodiment of FIGS. 9A to 9C describe a situation of information on the objects present in the "living room" 52 as in the right side table of FIG. 8B being stored in the storage 130. In addition, an artificial intelligence model corresponding to the "living room" 52 being stored as a living room model 852 of FIG. 8C may be assumed.

Referring to FIG. 9A, the electronic apparatus 100 may identify the "air conditioner" 11 and the "TV" 13 in the "living room" 800-10. In addition, referring to FIG. 9A, because the "chair" 23 that was not present in the previous "living room" 800-10 is now present in the "living room" 800-10, the electronic apparatus 100 may also identify the "chair" 23 in the "living room" 800-10.

When the "chair" 23 that was not present in the previous "living room" 800-10 is newly identified, the first processor 140-1 may update information on the objects present in the "living room" 52 from the information on objects present at each of the plurality of areas stored in the storage 130.

Accordingly, referring to FIG. 9B, the information on the objects present in the "living room" 52 stored in the storage 130 may be updated to include the "chair" 23 in addition to the "air conditioner" 11 and the "TV" 12.

In this case, referring to FIG. 9C, the first processor 140-1 may add the trained part (e.g., including the node 723) to identify the "chair" 23 of the fully-connected layer 702 to the artificial intelligence model 852 corresponding to the "living room" 52 to obtain an artificial intelligence model 952. The part trained to identify the "char" 23 may refer to the part used in the inference process to generate an output of the node 723 related to the "chair" 23 of the fully-connected layer 702.

Although all of nodes of the "bed" 21, the "chair" 23, and the "sofa" 22 are illustrated as comprised in the one independent fully-connected layer in FIG. 7B, the node for identifying the "chair" may be included in a separate independent fully-connected layer according to another embodiment. In this case, the part trained to identify the "chair" 23 may be an independent fully-connected layer including the node to identify the "chair" 23.

Further, the first processor 140-1 may update the artificial intelligence model corresponding to the "living room" 52 to an obtained artificial intelligence model 952 and store the same in the storage 130.

When the artificial intelligence or electronic apparatus 100 is located at one area of the plurality of areas, if (or based on) an object of the related area is not identified even when the second processor 140-2 loads the artificial intelligence model corresponding to the related area to the volatile memory 145, the second processor 140-2 may sequentially load a different artificial intelligence model of the plurality of artificial intelligence models to identify the related object.

If (or based on) the related object is identified through a different artificial intelligence model, the first processor 140-1 may use the information on the identified object to change the information on the objects present at the related area from information on objects present at each of the plurality of areas. In addition, the first processor 140-1 may use information on the changed object to update the artificial intelligence model corresponding to the related area. As a specific example, the fully-connected layer trained to recognize the identified object may be added to the artificial intelligence model corresponding to the related area.

The information on the objects present at each of the plurality of areas may be generated and updated by user input received by the electronic apparatus 100 and/or data received by the electronic apparatus 100 from the external apparatus and stored in the storage 130. In this case, the first processor 140-1 may also use the generated/updated "information on objects present at each of the plurality of areas" to update the artificial intelligence model corresponding to each of the plurality of areas.

The obtaining and/or updating of the artificial intelligence models corresponding to each of the plurality of areas may be performed based on changes in information on only "fixed type objects" (and not non-fixed type objects) present at each of the plurality of areas, according to one or more embodiments.

The fixed type object may refer to objects with nearly no movement in an actual life of a person such as, for example, a bed, a sofa, a TV, and the like, while a non-fixed type object may refer to objects with frequent movement in an actual life of a person such as, for example, a cup, a plate, a ball, a toy, and the like.

The second processor 140-2 may, even if the electronic apparatus 100 is positioned at any area of the plurality of areas, always load the artificial intelligence model trained to identify the non-fixed type object to the volatile memory 145. In this case, the plurality of artificial intelligence models stored in the storage 130 corresponding to each of the plurality of areas may be artificial intelligence models trained to identify the fixed type objects.

Figure 10:
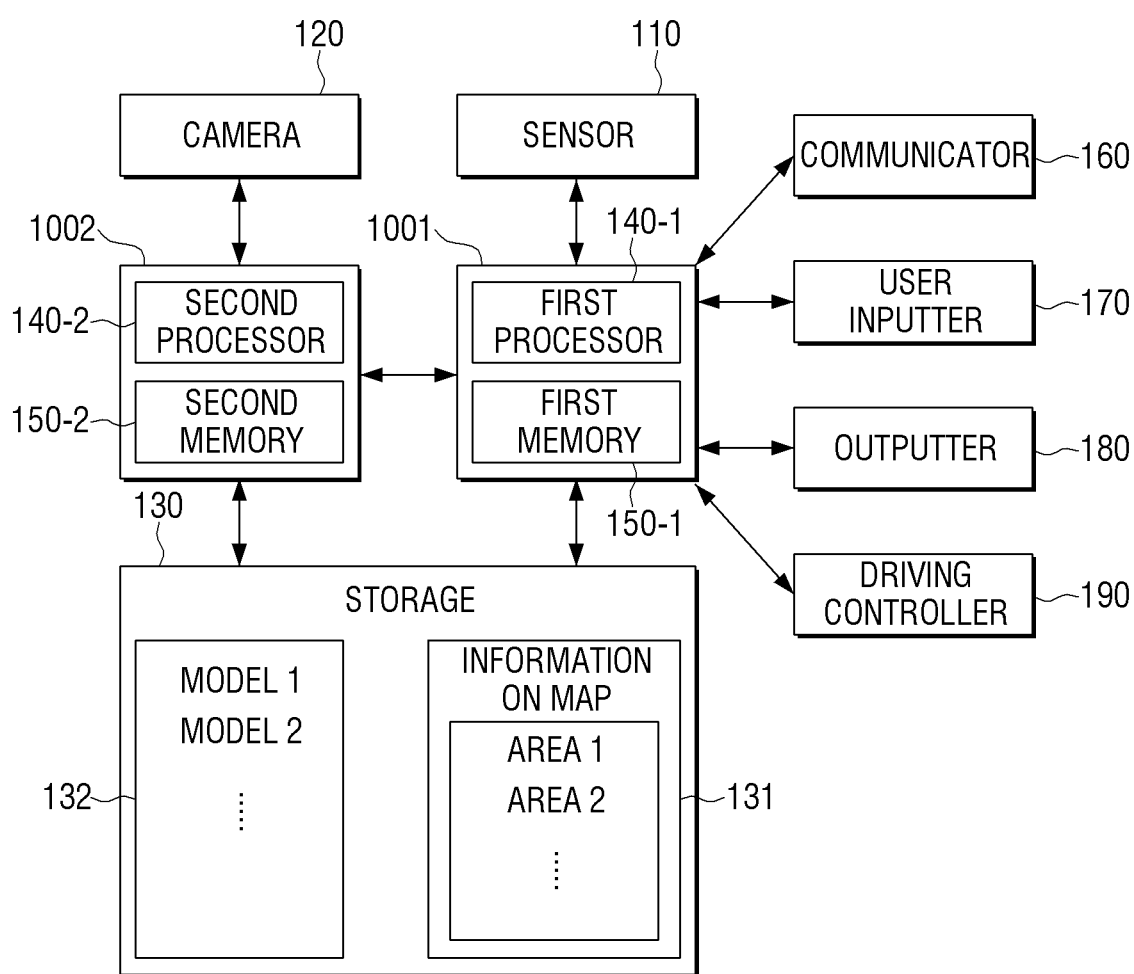
FIG. 10 is a block diagram illustrating a configuration of an electronic apparatus according to various embodiments.

FIG. 10 is a block diagram illustrating a detailed configuration of an electronic apparatus 100 including a first processor 140-1 and a second processor 140-2 according to an embodiment.

Referring to FIG. 10, the electronic apparatus 100 may further include at least one of a first memory 150-1, a second memory 150-2, a communicator including circuitry 160, a user inputter 170 (or user input device), an outputter 180 (or output device), and a driving controller 190 in addition to the sensor 110, the camera 120, the storage 130, the first processor 140-1, and the second processor 140-2.

The sensor 110 may be implemented as a light detection and ranging (LiDAR) sensor, an ultrasonic sensor, and the like. When the sensor 110 is implemented as a LiDAR sensor, the sensing data generated according to the sensed result of the sensor 110 may include information on the structured objects present in the surroundings and/or the distance between at least a part of things (or objects) and the electronic apparatus 100. Information on the above-described distance may form or be the basis of information on structure (i.e., shape and/or size) of structured objects/things present in the surroundings of the electronic apparatus 100.

The camera 120 may be implemented as a RGB camera, a 3D camera, and the like. The 3D camera may be implemented as a time of flight (TOF) camera including a TOF sensor and an infrared (IR) light. The 3D camera may include an IR stereo sensor. The camera 120 may include sensors such as a charge-coupled device (CCD) and a complementary metal-oxide semiconductor (CMOS), but is not limited thereto. If the camera 120 includes a CCD, the CCD may be implemented as a red/green/blue (RGB) CCD, an IR CCD, and the like.

The information on the map stored in the storage 130 may include information on the purpose of each of the plurality of areas. The purpose of each of the plurality of areas may relate to the "living room," the "bedroom," the "kitchen," the "bathroom," and the like if the map including the plurality of areas relates to, for example, a map of the "home."

In the storage 130, information on objects present in each of the plurality of areas on the map may be stored in addition to the plurality of artificial intelligence models and information on the map.

Information on the objects present at each of the plurality of areas may include the name, type and/or the like of the object present at each of the plurality of areas. The information on the objects may include information on the identity of a person if the object is a person. The information on the objects present at each of the plurality of areas may be stored/managed to match information output by the plurality of artificial intelligence models to identify at least one object from the images obtained through the camera 120 in the plurality of areas.

The information on the objects present at each of the plurality of areas may be pre-stored or obtained by the electronic apparatus 100 performing object recognition at each of the plurality of areas.

The first processor 140-1 may consist of or include one or a plurality of processors. The one or plurality of processors may be a generic processor such as a central processing unit (CPU) and an application processor (AP), and a graphics dedicated processor such as a graphics processing unit (GPU) and a vision processing unit (VPU), and the like.

The first processor 140-1 may control various configurations included in the electronic apparatus 100 by executing at least one instruction stored in the first memory 150-1 or the storage 130 connected to the first processor 140-1.

To this end, information or instruction to control the various configurations included in the electronic apparatus 100 may be stored in the first memory 150-1.

The first memory 150-1 may include a read-only memory (ROM), a random access memory (RAM), e.g., dynamic RAM (DRAM), synchronous DRAM (SDRAM), and double data rate SDRAM (DDR SDRAM)) and the like, and may be implemented together with the first processor 140-1 on one chip 1001.

The second processor 140-2 may also be implemented as one or more processors. The second processor 140-2 may be implemented as an artificial intelligence dedicated processor such as a neural processing unit (NPU), and may include a volatile memory 145 for loading at least one artificial intelligence model. The volatile memory 145 may be implemented as one or more status RAM (SRAM).

The second memory 150-2 may be stored with information or instructions for controlling the function performed by the second processor 140-2 for object recognition. The second memory 150-2 may also include a ROM, a RAM (e.g., DRAM, SDRAM, DDR SDRAM) and the like, and may be implemented together with the second processor 140-2 on one chip 1002.

The communicator including circuitry 160 is a configuration for the electronic apparatus 100 to send and receive signals/data by performing communication with at least one external apparatus.

The communicator including circuitry 160 may include a wireless communication module, a wired communication module, and the like.

The wireless communication module may include at least one of a Wi-Fi communication module, a Bluetooth module, an infrared data association (IrDA) communication module, a $3^{rd}$ generation (3G) mobile communication module, a 4th generation (4G) mobile communication module, and a 4G long term evolution (LTE) communication module to receive content from an external server or external apparatus.

The wired communication module may be implemented as wired ports such as, for example, a thunderbolt port, a USB port, and the like.

The first processor 140-1 may use data received externally through the communicator including circuitry 160 to generate/update information on the map.

The first processor 140-1 and/or the second processor 140-2 may use data received externally through the communicator including circuitry 160 to generate/update the artificial intelligence model corresponding to each of the plurality of areas.

The first processor 140-1 may, based on receiving a control signal through the communicator including circuitry 160, control the second processor 140-2 to start/end recognition of an object located in at least one area of the plurality of areas. At this time, the control signal may have been received from a remote control for controlling the electronic apparatus 100 or a smartphone stored with remote control applications on the electronic apparatus 100.

The at least part of the plurality of artificial intelligence models stored in the storage 13 may be artificial intelligence models included in the data received from the external apparatus such as a server apparatus to the electronic apparatus 100 through the communicator including circuitry 160.

When the second processor 140-2 is not able to recognize the object included in the image obtained through the camera 120 despite using all of the plurality of artificial intelligence models stored in the storage 130, the first processor 140-1 may transmit data on the obtained image to the server apparatus through the communicator including circuitry 160.

At this time, the data on the results of recognizing the object included in the obtained image may be received by the electronic apparatus 100 from the server apparatus through the communicator including circuitry 160.

Further, the first processor 140-1 may receive data of the artificial intelligence model trained to identify recognized objects from the external apparatus through the communicator including circuitry 160, and may store the received artificial intelligence model in the storage 130.

When data indicating the location of the electronic apparatus 100 is received from the external apparatus through the communicator including circuitry 160, the first processor 140-1 may use the received data to determine in which area the electronic apparatus 100 is located.

Based on a user input received through the user inputter 170, the first processor 140-1 may update information on the map and/or at least a part of the information on the objects present in at least one of the plurality of areas. In addition, the processor 140-1 may use data received according to user input to generate information on the map.

Based on the user input received through the user inputter 170, the first processor 140-1 may control the moving means or mechanism of the electronic apparatus 100 to move around at least one area of the plurality of areas, and may control the second processor 140-2 to start/end object recognition.

When a user input indicating the location of the electronic apparatus 100 is received through the user inputter 170, the first processor 140-1 may use the received user input to determine in which area the electronic apparatus 100 is located.

The user inputter 170 may include one or more of a button, a keyboard, a mouse, and the like. In addition, the user inputter 170 may include a touch panel implemented together with a display or a separate touch panel.

The user inputter 170 may include a microphone to receive a voice input of a user command or information, and may be implemented together with the camera 120 to recognize a user command or information in motion or gesture form.

The outputter 180 may be a configuration for the electronic apparatus 100 to provide the obtained information to the user.

For example, the outputter 180 may include a display, a speaker, an audio terminal, and the like to visually/audibly provide the user with object recognition results.

The driving controller 190, as a configuration to control the moving means or mechanism of the electronic apparatus 100, may include an actuator for providing power to the moving means or mechanism of the electronic apparatus 100. The first processor 140-1 may control the moving means or mechanism of the electronic apparatus 100 through the driving controller 190 to move the electronic apparatus 100.

The electronic apparatus 100 may further include various configurations not illustrated in FIG. 10 in addition thereto.

The above-described embodiments have been described based on the plurality of artificial intelligence models being stored in the storage 130, but it is understood that one or more other embodiments are not limited thereto. For example, according to one or more other embodiments, the plurality of artificial intelligence models may be stored in an external server apparatus and object recognition for each area may be possible through the electronic apparatus 100.

In addition, the electronic apparatus may perform object recognition for each area through communication with an external terminal apparatus implemented as a smartphone, tablet PC, and the like.

Figure 11:
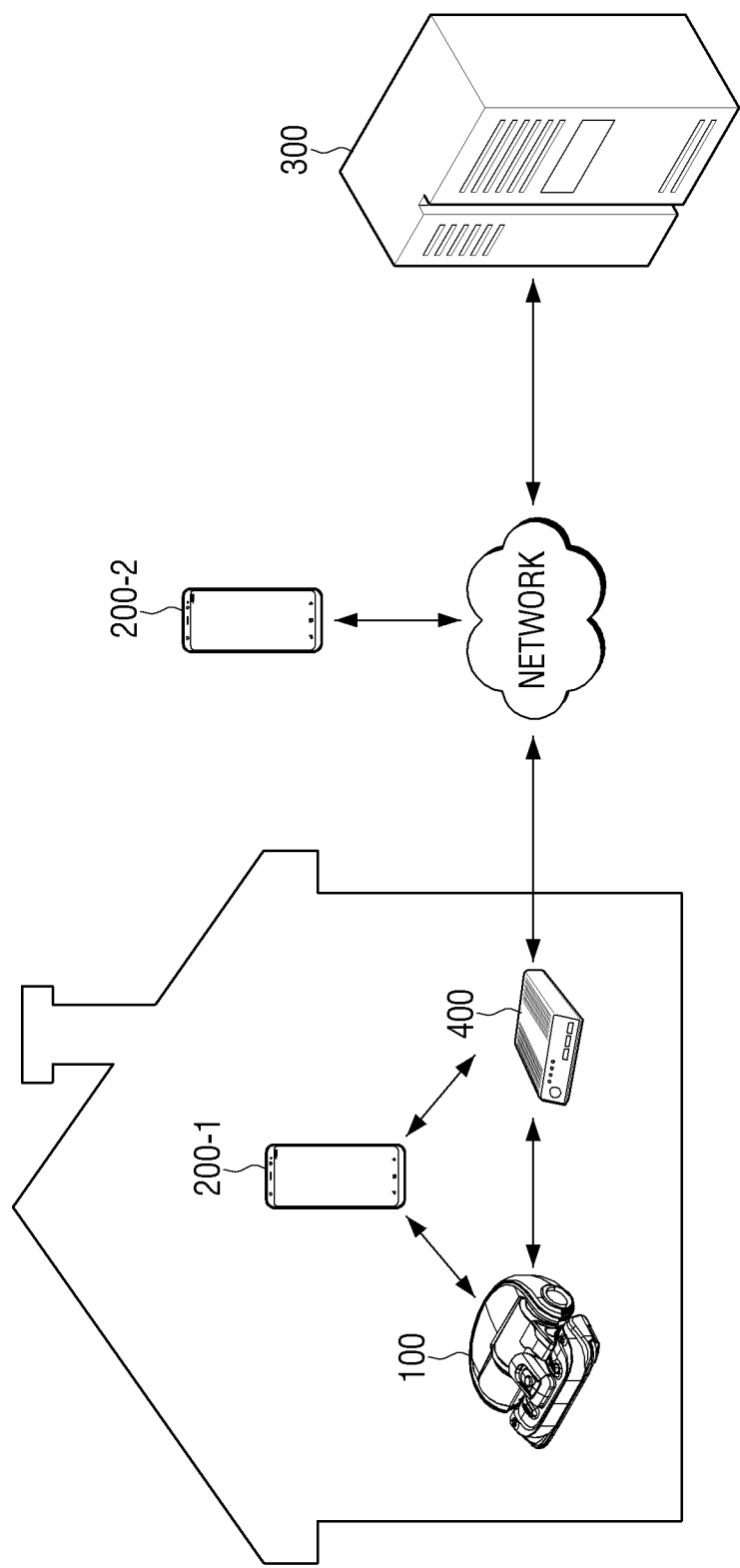
FIG. 11 is a diagram illustrating various embodiments of an electronic apparatus performing object recognition based on communication with external apparatuses including a server apparatus and an external terminal apparatus.

FIG. 11 is a diagram illustrating various embodiments of an electronic apparatus 100 performing object recognition based on communication with external apparatuses including a server apparatus 300 and an external terminal apparatus 200-1 and 200-2.

Referring to FIG. 11, the electronic apparatus 100, which is a robot cleaner in the present example, may perform communication with external apparatuses 200-1 and 200-2 such as a smartphone and a server apparatus 300. In this case, the electronic apparatus 100 may also perform communication with external apparatuses 200-1, 200-2 and 300 through a relay apparatus 400 configured with routers and the like.

The electronic apparatus 100 may perform recognition of objects present at a plurality of areas based on the external apparatus 200-1, which is a smartphone, or a control signal received from the external apparatus 200-2. In addition, the electronic apparatus 100 may transmit information on the recognized object to the external apparatus 200-1 and/or the external apparatus 200-2.

FIG. 11 illustrates each of the plurality of artificial intelligence models trained to recognize at least one object being stored in a server apparatus 300 and not (or not necessarily) the storage 130 of the electronic apparatus 100.

In this case, information on the plurality of artificial intelligence models (i.e., information on objects recognizable by each of the plurality of artificial intelligence models) stored in the server apparatus 300 may be received by the electronic apparatus 100 from the server apparatus 300 through the communicator including circuitry 160.

The processor 140-1 may then select the artificial intelligence model corresponding to the area determined as where the electronic apparatus 100 is located from the plurality of artificial intelligence models stored in the server apparatus 300.

The first processor 140-1 may then control the communicator including circuitry 160 to transmit information on the selected artificial intelligence model to the server apparatus 300.

When data on the selected artificial intelligence model is received from the server apparatus 300 through the communicator including circuitry 160, the first processor 140-1 may control the second processor 140-2 to load the selected artificial intelligence model (data) to the volatile memory 145. The second processor 140-2 may then perform object recognition by inputting the image obtained through the camera 120 to the loaded artificial intelligence model.

In this case, the first processor 140-1 may store the data on the received artificial intelligence model to the storage 130.

According to another embodiment, the electronic apparatus 100 may include one processor.

Figure 12A:
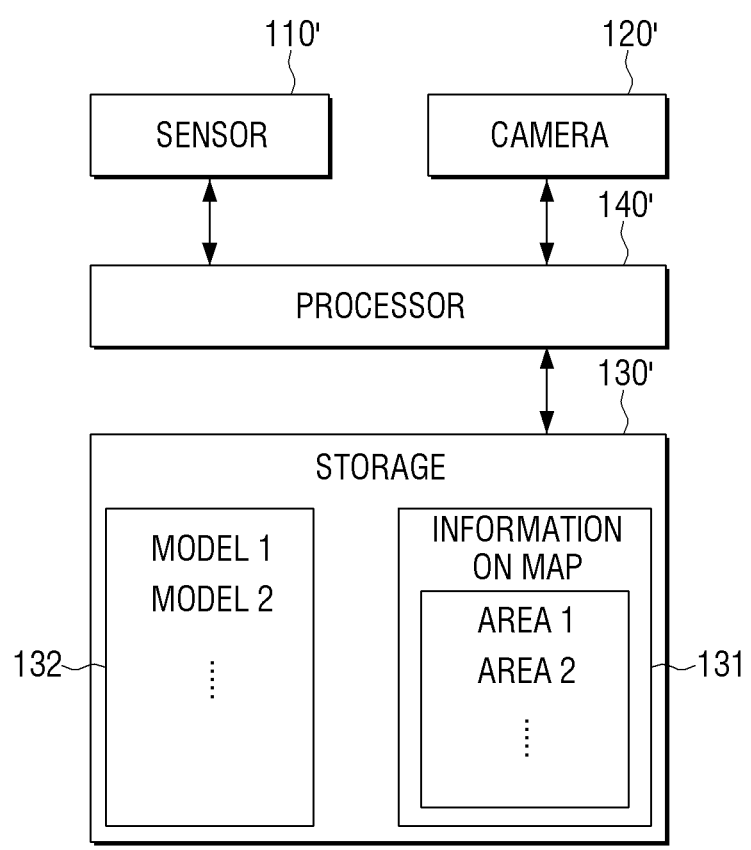
FIG. 12A is a block diagram illustrating a configuration of an electronic apparatus including a processor.
Figure 12B:
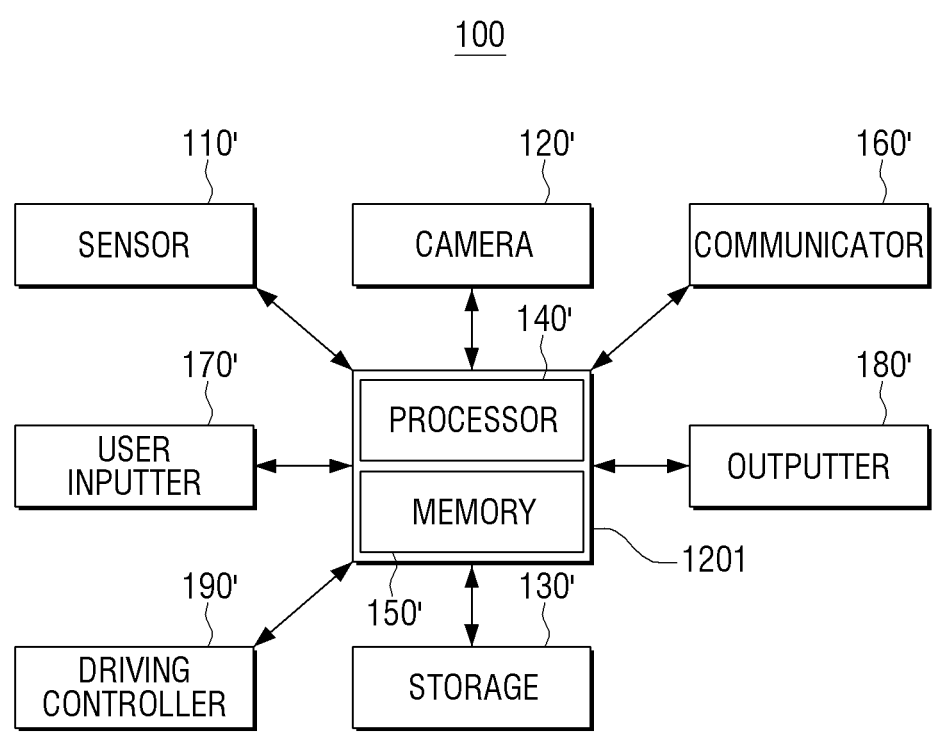
FIG. 12B is a block diagram illustrating a configuration of an electronic apparatus including a processor.

FIGS. 12A and 12B are block diagrams illustrating a configuration of an electronic apparatus 100 including a processor 140'.

Referring to FIG. 12A, the electronic apparatus 100 may include a processor 140' controlling the electronic apparatus 100 and connected to a sensor 110', a camera 140' and a storage 130'. Additionally, the electronic apparatus 100 may include the sensor 110', the camera 140' and the storage 130'.

The processor 140' may be implemented as a generic processor such as a CPU and an AP, a graphics dedicated processor such as a GPU and a vision processing unit (VPU), an artificial intelligence dedicated processor such as an NPU, or the like, and may include a volatile memory for loading at least one artificial intelligence model.

The processor 140' may perform operations performed by the first processor 140-1 or the second processor 140-2 as in the various embodiments described above.

Specifically, the processor 140' may identify a plurality of areas included in the map based on information on the map stored in a storage 130', determine an area in which the electronic apparatus 100 is located from the plurality of areas based on sensing data received from the sensor 110', and load the artificial intelligence model corresponding to the determined area from the plurality of artificial intelligence models stored in the storage 130 to the volatile memory. The processor 140' may input the image obtained through the camera 120' to the loaded artificial intelligence model to identify the object.

Referring to FIG. 12B, the electronic apparatus 100 including the processor 140' may further include a memory 150', a communicator 160' including circuitry, a user inputter 170', an outputter 180', a driving controller 190', and the like connected to the processor 140' as in FIG. 10.

The memory 150' is a configuration for storing an operating system (OS) for controlling the overall operations of elements of the electronic apparatus 100 and data related to the elements of the electronic apparatus 100. The memory 150' may include at least one instruction related to the one or more elements of the electronic apparatus 100.

The memory 150' may include a ROM, a RAM (e.g., DRAM, SDRAM, and DDR SDRAM) and the like, and may be implemented to connect with the processor 140' in one chip 1201.

Figure 13:
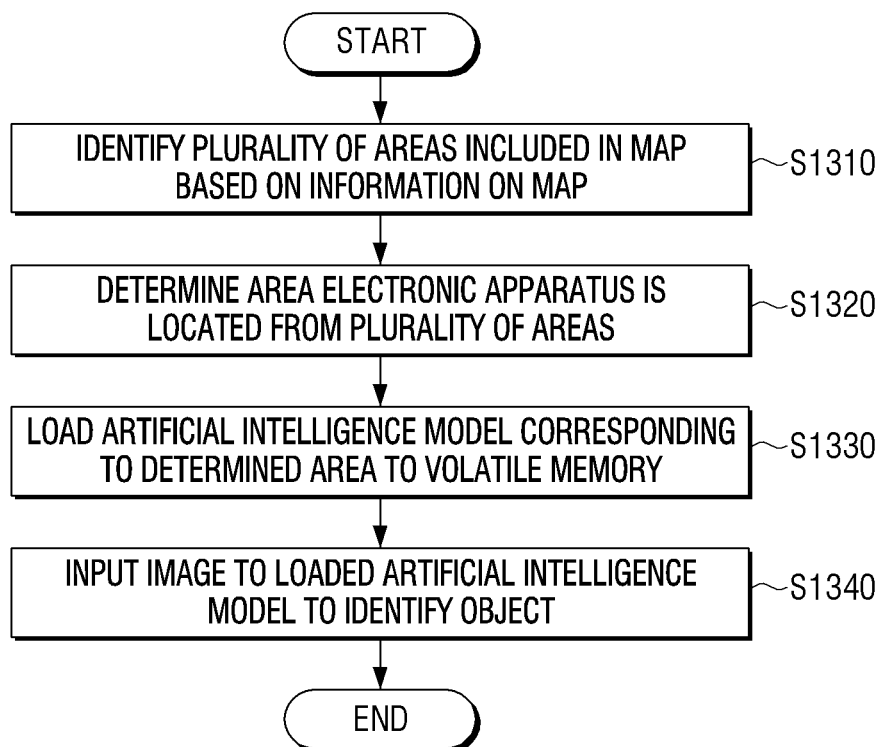
FIG. 13 is a flowchart illustrating a control method of an electronic apparatus according to an embodiment.
Figure 14:
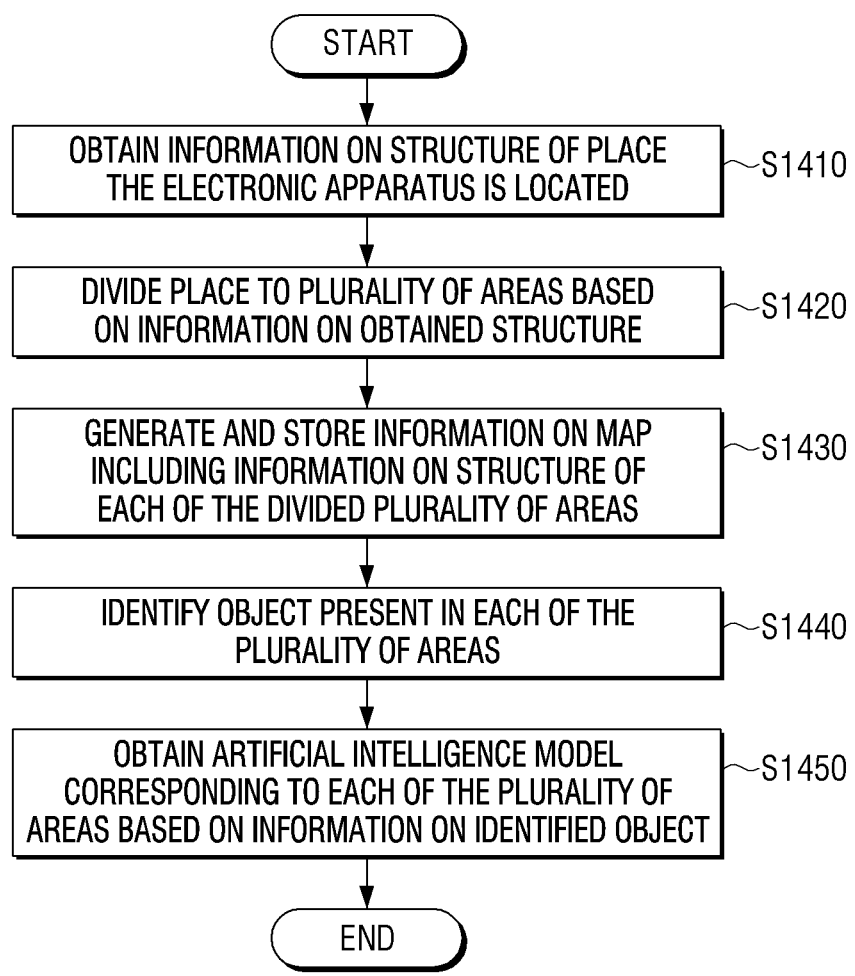
FIG. 14 is a flowchart illustrating an embodiment of a control method of an electronic apparatus according to an embodiment generating information on a map, and identifying objects present in each of a plurality of areas to obtain an artificial intelligence model corresponding to each of the plurality of areas.
Figure 15:
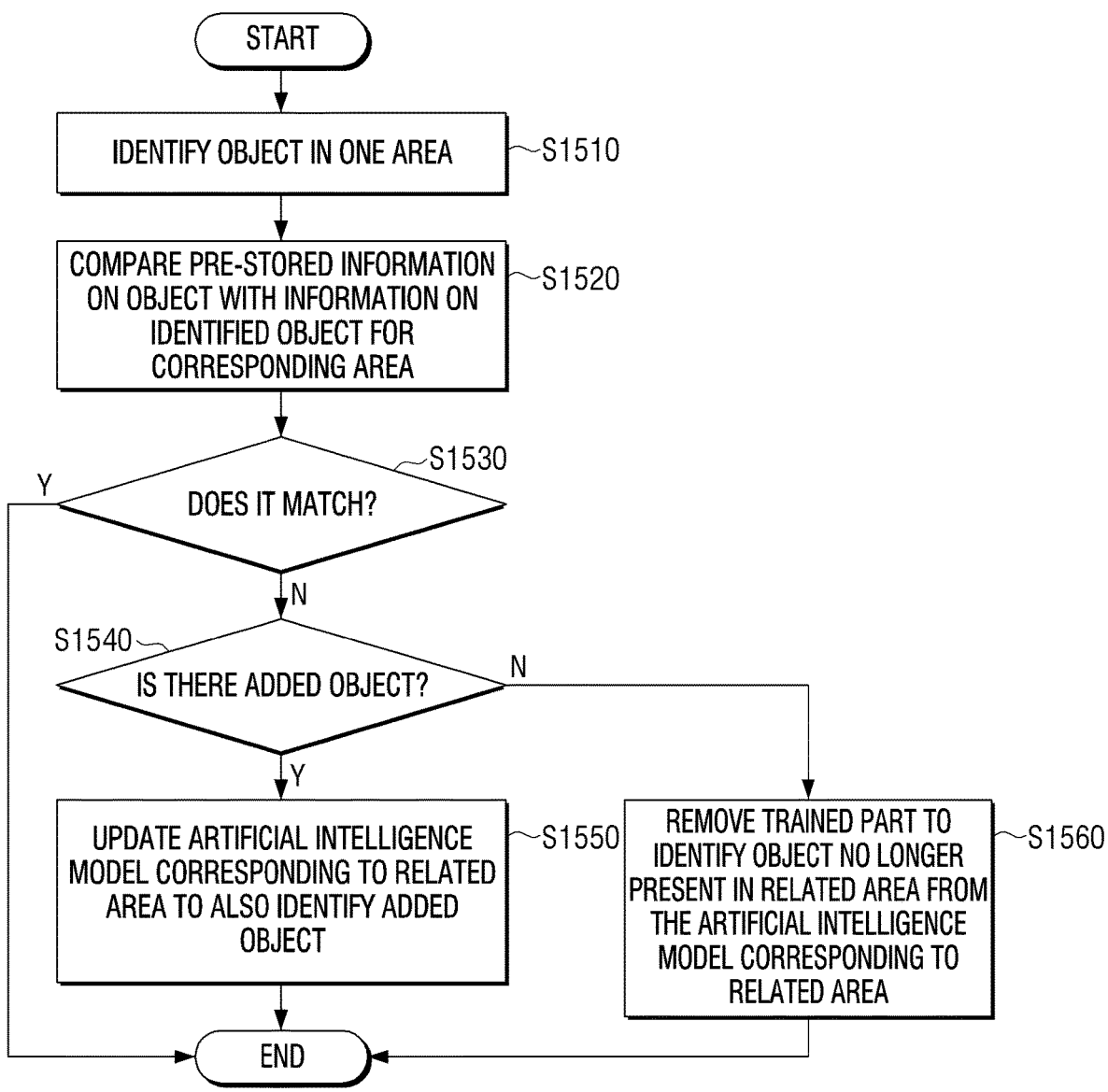
FIG. 15 is a diagram of an algorithm illustrating an example of a control method of an electronic apparatus according to an embodiment updating an artificial intelligence model corresponding to each of a plurality of areas according to results identifying an object present in each of the plurality of areas.

FIGS. 13 to 15 describe a control method of an electronic apparatus 100 according to one or more embodiments.

FIG. 13 is a flowchart illustrating a control method of an electronic apparatus 100 using an object recognition model according to an embodiment of the disclosure.

Referring to FIG. 13, the control method may identify a plurality of areas included in the map based on information on the map stored in the storage of the electronic apparatus 100 (operation S1310). The information on the map may include at least one of information on the structure of the place, information on the structure of each of the plurality of areas included in the map, information on the location on the map of each of the plurality of areas, information on the purpose of each of the plurality of areas, and the like.

Then, the area in which the electronic apparatus 100 is located from among the plurality of areas may be determined based on the sensing data received from the sensor (operation S1320).

In this case, the area in which the electronic apparatus 100 is located may be determined using information on the map stored in the storage and sensing data received through the sensor. As a specific example, if the sensor is a LiDAR sensor, the sensing data received from the sensor and the information on the map stored in the storage may be compared and the area in which the electronic apparatus 100 is located may be determined.

At this time, information on the structure (i.e., shape and/or size) of the surroundings of the electronic apparatus 100 included in the sensing data may be compared with information on the structure (i.e., shape and/or size) of each of the plurality of areas on the map included in the information on the map, and the area in which the electronic apparatus 100 is located from the plurality of areas on the map may be determined.

By using data on the surrounding image obtained through the camera, it may be possible to determine in which area of the plurality of areas the electronic apparatus 100 is located. For example, if information on the map includes data on the 3D image of the plurality of areas, the area in which the electronic apparatus 100 is located may be determined using the results of comparing images of each of the plurality of areas included in the information on the map with the 3D image obtained through the camera, implemented as a 3D camera.

In addition, the area in which the electronic apparatus 100 is located may be determined by identifying one or more objects from the image obtained through the camera in areas the electronic apparatus is located.

As a specific example, the object in the image may be identified by inputting the image photographed through the camera in the area in which the electronic apparatus 100 is located to at least one of the stored plurality of artificial intelligence models. If the identified object is a bed, one or more objects per area may use pre-stored information to identify that the bed corresponds with the "bedroom." Further, the area in which the electronic apparatus 100 is located may be determined as the "bedroom." The area in which the electronic apparatus 100 is located may then be determined as the "bedroom."

In addition, a point where the electronic apparatus 100 is located may be determined on the map using an inertia sensor, an acceleration sensor, and the like, and the area including the determined point, from among the plurality of areas on the map, may be determined as an area in which the electronic apparatus 100 is located.

The process of determining an area in which the electronic apparatus 100 is located is not limited to the above-described embodiments, and other various methods may be applicable.

The control method may include loading the artificial intelligence model corresponding to the determined area from the plurality of artificial intelligence models stored in the storage to the volatile memory (operation S1330).

Each of the plurality of artificial intelligence models may include a convolutional layer and a fully-connected layer trained to identify an object based on characteristic information extracted from the convolutional layer. The convolutional layer, at this time, may be a common layer of the plurality of artificial intelligence models, and the fully-connected layer may be a layer provided individually to each of the plurality of artificial intelligence models.

If (or based on) the electronic apparatus 100 is located at a first area, the convolutional layer and the fully-connected layer corresponding to a first model from among the plurality of artificial intelligence models may be loaded to the volatile memory. If (or based on) the electronic apparatus 100 is located at a second area, the convolutional layer and the fully-connected layer corresponding to a second model from among the plurality of artificial intelligence models may be loaded to the volatile memory.

The first model may correspond to the first area of the plurality of areas, and the second model may correspond to the second area of the plurality of areas. In this case, the logical mapping information that maps the first model in the first area and the logical mapping information that maps the second model in the second area may be stored in the storage, and the control method may use the logical mapping information stored in the storage to load the artificial intelligence model corresponding to each area.

The image obtained through the camera may then be input to the loaded artificial intelligence model to identify the object (operation S1340). Specifically, because information on the objects output by the loaded artificial intelligence model may be obtained, the information on the objects may be varied according to the artificial intelligence model properties such as name, type, and the like of the object.

The control method may generate information on the map of the place in which the electronic apparatus 100 is located to store in the storage. In addition, the control method may newly obtain/define the artificial intelligence model corresponding to each of the plurality of areas included in the map.

FIG. 14 is a flowchart illustrating an embodiment of a control method of an electronic apparatus 100 according to an embodiment generating information on a map, and identifying objects present in each of a plurality of areas to obtain an artificial intelligence model corresponding to each of the plurality of areas.

Referring to FIG. 14, the control method may obtain information on the structure of the place in which the electronic apparatus 100 is located based on sensing data received from the sensor (operation S1410).

In an example, information on the structure (i.e., shape and/or size) of the place in which the electronic apparatus is located may be obtained using sensing data received from the sensor, implemented as a LiDAR sensor.

Then, based on information on the obtained structure, the place in which the electronic apparatus 100 is located may be divided into a plurality of areas (operation S1420).

In this case, the plurality of areas may be divided on the map using a first algorithm. For example, a point where there is a dividing line or a protrusion (or threshold) on a floor, a point where a movable width becomes narrow, a point where there is a wall, a point where a wall ends, a point where there is be a door, and the like may be identified through sensing data obtained through the sensor, which may be a LiDAR sensor, and/or an image obtained through a camera. Further, using the identified points as demarcations between areas, each area on the map may be divided. However, other methods may be applied in addition thereto.

Then, information on the map including information on the structure of each of the divided plurality of areas may be generated, and the information on the generated map may be stored in the storage (operation S1430).

The control method may, when artificial intelligence models trained to identify a plurality of objects are stored in the storage of the electronic apparatus 100, input the image obtained through the camera while the electronic apparatus 100 is located in each of the plurality of areas to the stored artificial intelligence model and identify the object present at each of the plurality of areas (operation S1440).

The stored artificial intelligence model may include the convolutional layer and the fully-connected layer trained to identify a plurality of objects based on characteristic information extracted from the convolutional layer.

Then, a first object may be identified in the first area of the plurality of areas, and a second object may be identified in the second area of the plurality of areas.

Then, the artificial intelligence model corresponding to each of the plurality of areas may be obtained from the stored artificial intelligence model based on information on the identified object (operation S1450).

Specifically, when (or based on) a first object of a plurality of objects is identified as present in the first area based on information on the objects present at the first area of the plurality of areas, the first model including the part trained to identify the first object from the convolutional layer of the stored artificial intelligence model and the fully-connected layer of the stored artificial intelligence model may be obtained.

In addition, when the second object of the plurality of objects is identified as present in the second area based on information on the objects present in the second area of the plurality of areas, the second model including other parts trained to identify the second object from the convolutional layer of the stored artificial intelligence model and the fully-connected layer of the stored artificial intelligence model may be obtained.

The control method may identify the object present at each of the plurality of areas according to a pre-set interval, user input, or the like, and use the information on the identified object to update the artificial intelligence model corresponding to each of the plurality of areas.

Specifically, the image obtained through the camera while the electronic apparatus 100 is located at one area of the plurality of areas may be input to the plurality of artificial intelligence models loaded in the volatile memory and the object present at the related area may be identified. In this case, at least one of the plurality of artificial intelligence models in the volatile memory may be sequentially loaded, and the image obtained from the related area may be input to the loaded artificial intelligence model. Based on information on the identified object, the artificial intelligence model corresponding to the related area may be updated.

For example, when information on objects present at each of the plurality of areas are stored in the storage of the electronic apparatus, the control method may determine at least one object present at one area of the plurality of areas based on information on objects present at each of the plurality of areas stored in the storage.

In this case, based on information on the objects identified in the related area, the object not identified in the related area from the determined objects may be determined. In the artificial intelligence model corresponding to the related area from among the plurality of artificial intelligence models, the part trained to identify the object determined previously as not identified may be removed.

In another example, when information on objects present at each of the plurality of areas is stored in the storage of the electronic apparatus 100, the control method may determine at least one object present in one area of the plurality of areas based on information on the objects present at each of the plurality of areas stored in the storage.

In this case, based on information on objects identified in the related area, objects not included among the determined at least one object of the identified objects in the related area may be determined. At this time, the fully-connected layer trained to identify the object not included in the at least one determined object may be added to the artificial intelligence model corresponding to the related area from among the plurality of artificial intelligence models.

FIG. 15 is a diagram of an algorithm illustrating an example of a control method of an electronic apparatus 100 according to an embodiment updating an artificial intelligence model corresponding to each of a plurality of areas according to results identifying an object present in each of the plurality of areas.

Referring to FIG. 15, the control method may input an image obtained through the camera in one area of the plurality of areas to at least one of the plurality of artificial intelligence models to identify the object (operation S1510).

Then, information on the pre-stored object of the related area may be compared with information on the identified object (operation S1520).

If information on the identified object matches with information on the pre-stored object (operation S1530-Y), the artificial intelligence model stored to correspond to the related area may not be updated.

If information on the identified object does not match with information on the pre-stored object (operation S1530-N), and if information on a newly added object is included in addition to the information on the identified object with the information on the pre-stored object (operation S1540-Y), the artificial intelligence model corresponding to the related area may be updated so that the artificial intelligence model stored to correspond to the related area may also identify the added object (operation S1550).

For example, while the identified object in the related area may be a TV and a sofa, if the pre-stored object on the related area is a TV, the artificial intelligence model corresponding to the related area may update the related artificial intelligence model to identify the sofa in addition to the TV. In this case, a separate fully-connected layer trained to identify the sofa may be added to the fully-connected layer including the related artificial intelligence model.

Even if information on the identified object does not match with the information on the pre-stored object (operation S1530-N), and there is an object not included in the information on the identified objects from the information on the pre-stored objects (operation S1540-N), updating the artificial intelligence model corresponding to the related area may be required or performed. That is, because the object present at a previously related area is no longer present at the related area, the part trained to identify the object no longer present in the related area may be removed (operation S1560).

For example, while the identified object in the related area may be a TV and a sofa, if the pre-stored object on the related area is a TV, a sofa, and a chair, the part trained to identify the chair in the artificial intelligence model corresponding to the related area may be removed. Specifically, the part used in the inference process to generate an output of the node indicating the possibility of the chair being present may be removed from the fully-connected layer of the related artificial intelligence model. However, even if the part is related to the inference process for generating output of the node indicating the possibility of the chair being present, the part may not be removed if the part relates to the inference process for generating output of nodes indicating the possibility of the TV or the sofa being present.

The control method of the electronic apparatus 100 described with reference to FIGS. 13 to 15 above may be implemented through the electronic apparatus 100 illustrated and described above with reference to FIGS. 2 and 11, and the electronic apparatus 100 illustrated and described above with reference to FIGS. 12A and 12B.

The control method of the electronic apparatus 100 described with reference to FIGS. 13 to 15 above may be implemented through an electronic apparatus 100 and a system including the one or more external apparatuses.

The electronic apparatus 100 and the control method of the electronic apparatus 100 as described above may not only use all artificial intelligence models for recognizing objects of various types, but also has the effect of accurately recognizing objects at a fast rate.

Specifically, because the electronic apparatus 100 and the control method according to one or more embodiments selectively loads only artificial intelligence models appropriate to the area in which the electronic apparatus is located to use in object recognition, the electronic apparatus 100 and the control method according to an embodiment is advantageous in that objects of many types may be recognized within a very short period of time by processing only a relatively small amount.

The electronic apparatus 100 and control method according to one or more embodiments is also advantageous in that the artificial intelligence model for each area may be updated according to circumstance to quickly maintain or further improve the object recognition rate.

The electronic apparatus 100 according to one or more embodiments may not only be able to perform recognition of objects of a broad-ranging type using only the self-stored artificial intelligence models regardless of communication with the server, but also is advantageous in that object recognition a relatively fast rate may be possible despite the limited processing capacity.

The various embodiments described above may be implemented in a recordable medium which is readable by computer or a device similar to computer using software, hardware, or the combination of software and hardware.

By hardware implementation, the embodiments described in the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

In some cases, embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

The non-transitory computer readable medium may refer, for example, to a medium that stores data semi-permanently, rather than storing data for a very short time, such as a register, a cache, and a memory, and is readable by an apparatus. Specific examples of the non-transitory computer readable medium may include a compact disc (CD), a digital versatile disc (DVD), a hard disc, a Blu-ray disc, a universal serial bus (USB), a memory card, a read only memory (ROM), and the like.

While embodiments have been illustrated and described above, it will be understood by those skilled in the art that various changes in form and details may be made therein without departing from the true spirit and full scope of the disclosure.

What is claimed is:

1. An electronic apparatus, comprising:
a sensor;
a camera;
a storage for storing a plurality of artificial intelligence models trained to identify objects and for storing information on a map;
a first processor configured to control the electronic apparatus; and
a second processor configured to recognize an object,
wherein the first processor is configured to determine, based on sensing data obtained from the sensor, an area in which the electronic apparatus is located from among a plurality of areas comprised in the map, and provide area information on the determined area to the second processor, and
wherein the second processor comprises a volatile memory and is configured to:
load an artificial intelligence model, from among the plurality of artificial intelligence models stored in the storage, to the volatile memory based on the area information provided by the first processor, and
input an image obtained through the camera to the loaded artificial intelligence model to identify an object.

2. The electronic apparatus of claim 1, wherein:
each of the plurality of artificial intelligence models comprises a convolutional layer and a fully-connected layer trained to identify an object based on characteristic information extracted from the convolutional layer;
the convolutional layer is a common layer in the plurality of artificial intelligence models; and
the second processor is further configured to load, to the volatile memory, the convolutional layer and the fully-connected layer of the artificial intelligence model corresponding to the determined area.

3. The electronic apparatus of claim 2, wherein:
the plurality of artificial intelligence models comprises a first model corresponding to a first area of the plurality of areas and a second model corresponding to a second area of the plurality of areas; and
the second processor is further configured to:
based on the electronic apparatus being located at the first area, load, to the volatile memory, the convolutional layer and the full-connected layer corresponding to the first model, and
based on the electronic apparatus being located at the second area, load, to the volatile memory, the convolutional layer and the fully-connected layer corresponding to the second model.

4. The electronic apparatus of claim 1, wherein:
the information on the map comprises information on structures of the plurality of areas; and
the first processor is further configured to compare the information on the structures with the sensing data obtained from the sensor to determine the area in which the electronic apparatus is located from among the plurality of areas.

5. The electronic apparatus of claim 1, wherein the first processor is further configured to:
obtain information on a structure of a place in which the electronic apparatus is located based on sensing data obtained from the sensor,
divide the place to the plurality of areas based on the obtained information on the structure,
generate the information on the map comprising information on structures of each of the divided plurality of areas and storing the generated information on the map in the storage.

6. The electronic apparatus of claim 5, wherein:
the second processor is further configured to input an image obtained through the camera while the electronic apparatus is located in a particular area, among the plurality of areas, to at least one artificial intelligence model among the stored plurality of artificial intelligence models to identify an object present in the particular area, and provide information on the identified object to the first processor; and
the first processor is further configured to obtain an artificial intelligence model corresponding to the particular area, based on the provided information on the identified object.

7. The electronic apparatus of claim 6, wherein:
each of the stored plurality of artificial intelligence models comprises a convolutional layer and a fully-connected layer trained to identify a plurality of objects based on characteristic information extracted from the convolutional layer; and the first processor is further configured to:
- based on a first object of the plurality of objects in a first area being identified as present based on information on an object present in the first area, obtain a first model comprising the convolutional layer and a first part of the fully-connected layer trained to identify the first object, and
- based on a second object of the plurality of objects in a second area being identified as present based on information on an object present in the second area, obtain a second model comprising the convolutional layer and a second part of the fully-connected layer trained to identify the second object.

8. The electronic apparatus of claim 1, wherein:

the second processor is further configured to input an image obtained through the camera while the electronic apparatus is located in the area, among the plurality of areas, to at least one artificial intelligence model, from among the plurality of artificial intelligence models, loaded to the volatile memory to identify an object present at the area, and provide information on the identified object to the first processor; and the first processor is further configured to update an artificial intelligence model corresponding to the area based on the information on the identified object provided from the second processor.

9. The electronic apparatus of claim 8, wherein:

the storage stores information on objects present at each of the plurality of areas; and the first processor is further configured to:
- based on the information on objects present at each of the plurality of areas stored in the storage, determine at least one object present in the area from among the plurality of areas,
- based on information on the identified object provided from the second processor, determine an object not identified in the area from among the determined at least one object, and
- update the artificial intelligence model corresponding to the area by removing a part trained to identify the determined unidentified object from the artificial intelligence model corresponding to the area.

10. The electronic apparatus of claim 8, wherein:

the storage stores information on objects present at each of the plurality of areas; and the first processor is further configured to:
- based on the information on objects present at each of the plurality of areas stored in the storage, determine at least one object present in the area,
- based on information on the identified object provided from the second processor, determine whether the identified object is not included among the at least one determined object present in the area, and
- based on the identified object being determined to not be included among the determined at least one object present in the area, add a trained part to identify the identified object to the artificial intelligence model corresponding to the area to update the artificial intelligence model corresponding to the area.

11. An electronic apparatus, comprising:

a camera;
a sensor;
a storage for storing a plurality of artificial intelligence models trained to identify objects and for storing information on a map; and
a processor configured to control the electronic apparatus, wherein the processor comprises a volatile memory, and wherein the processor is configured to:
- determine, based on sensing data obtained from the sensor, an area in which the electronic apparatus is located from among a plurality of areas comprised in the map,
- based on the determined area, load an artificial intelligence model from among the plurality of artificial intelligence models stored in the storage, and
- input an image obtained through the camera to the loaded artificial intelligence model to identify an object.

12. A control method of an electronic apparatus using an object recognition model, the control method comprising:

identifying a plurality of areas comprised in a map based on information on the map stored in a storage of the electronic apparatus;

determining an area in which the electronic apparatus is located from among the plurality of areas based on sensing data obtained from a sensor;

loading, to a volatile memory, an artificial intelligence model, from among a plurality of artificial intelligence models stored in the storage, based on the determined area; and identifying an object by inputting an image obtained through a camera to the loaded artificial intelligence model.

13. The control method of claim 12, wherein:

each of the plurality of artificial intelligence models comprises a convolutional layer and a fully-connected layer trained to identify an object based on characteristic information extracted from the convolutional layer;

the convolutional layer is a common layer in the plurality of artificial intelligence models;

the fully-connected layer is a layer individually provided to each of the plurality of artificial intelligence models; and the loading to the volatile memory comprises:
- loading, to the volatile memory, the convolutional layer and the fully-connected layer corresponding to a first model of the plurality of artificial intelligence models based on the electronic apparatus being located at a first area among the plurality of areas, and
- loading the convolutional layer and the fully-connected layer corresponding to a second model of the plurality of artificial intelligence models to the volatile memory based on the electronic apparatus being located at a second area among the plurality of areas.

14. The control method of claim 12, wherein:

the information on the map comprises information on structures of each of the plurality of areas; and the determining the area in which the electronic apparatus is located comprises comparing the information on the structures with the sensing data obtained from the sensor to determine the area in which the electronic apparatus is located from among the plurality of areas.

15. The control method of claim 12, further comprising:

obtaining information on a structure of a place in which the electronic apparatus is located based on sensing data obtained from the sensor;

dividing the place to the plurality of areas based on the obtained information on the structure; and generating the information on the map comprising information on structures of each of the divided plurality of areas and storing the generated information on the map in the storage.

16. The control method of claim 15, further comprising:
inputting an image obtained through the camera while the electronic apparatus is located in a particular area, of the plurality of areas, to at least one artificial intelligence model among the stored artificial intelligence models, to identify an object present in the particular area; and
obtaining an artificial intelligence model corresponding to the particular area, based on information on the identified object.

17. The control method of claim 16, wherein:
each of the stored plurality of artificial intelligence models comprises a convolutional layer and a fully-connected layer trained to identify a plurality of objects based on characteristic information extracted from the convolutional layer; and
the obtaining the artificial intelligence model comprises:
based on a first object of the plurality of objects in a first area being identified as present based on information on an object present in the first area, obtaining a first model comprising the convolutional layer and a first part of the fully-connected layer trained to identify the first object of the fully-connected layer, and
based on a second object of the plurality of objects in a second area being identified as present based on information an object present in the second area, obtaining a second model comprising the convolutional layer and a second part of the fully-connected layer trained to identify the second object.

18. The control method of claim 12, further comprising:
inputting an image obtained through the camera while the electronic apparatus is located in the area, among the plurality of areas, to at least one artificial intelligence model, from among the plurality of artificial intelligence models, loaded to the volatile memory to identify an object present at the area; and
updating an artificial intelligence model corresponding to the area based on the information on the identified object.

19. The control method of claim 18, further comprising:
wherein the storage stores information on objects present at each of the plurality of areas, and
wherein the updating the artificial intelligence model comprises:
based on the information on the objects present at each of the plurality of areas stored in the storage, determining at least one object present in the area from among the plurality of areas,
based on information on the identified object, determining an object not identified in the area from among the determined at least one object, and
removing a part trained to identify the determined unidentified object from the artificial intelligence model corresponding to the area.

20. The control method of claim 18, further comprising:
wherein the storage stores information on objects present at each of the plurality of areas, and
wherein the updating the artificial intelligence model comprises:
based on the information on objects present at each of the plurality of areas stored in the storage, determining at least one object present in the area,
based on information on the identified object, determining whether the identified object is not included among the determined at least one object present in the area,
based on the identified object being determined to not be included among the at least one determined object present in the area, adding a part trained to identify the identified object not to the artificial intelligence model corresponding to the area.

21. An electronic apparatus, comprising:
a storage; and
at least one processor comprising a volatile memory and configured to:
determine an area in which the electronic apparatus is located from among a plurality of areas comprised in a map,
based on the determined area, load an artificial intelligence model, from among the plurality of artificial intelligence models stored in the storage, corresponding to the determined area, and
input an image obtained through the camera to the loaded artificial intelligence model to identify an object.

* * * * *